(12) United States Patent
Rashid et al.

(10) Patent No.: US 11,168,177 B2
(45) Date of Patent: Nov. 9, 2021

(54) POLYURETHANES FOR CONTACT LENSES

(71) Applicant: OCUTEC LIMITED, Lanarkshire (GB)

(72) Inventors: Abdul Rashid, Lanarkshire (GB);
Gordon Honeyman, Lanarkshire (GB);
John Fraser, Lanarkshire (GB)

(73) Assignee: Ocutec Limited, Lanarkshire (GB)

( * ) Notice: Subject to any disclaimer, the term of this patent is extended or adjusted under 35 U.S.C. 154(b) by 330 days.

(21) Appl. No.: 15/324,138

(22) PCT Filed: Jul. 7, 2015

(86) PCT No.: PCT/GB2015/051960
§ 371 (c)(1),
(2) Date: Jan. 5, 2017

(87) PCT Pub. No.: WO2016/005733
PCT Pub. Date: Jan. 14, 2016

(65) Prior Publication Data
US 2017/0166683 A1    Jun. 15, 2017

(30) Foreign Application Priority Data

Jul. 7, 2014 (GB) .................................... 1412053
Oct. 6, 2014 (GB) .................................... 1417601

(51) Int. Cl.
| | |
|---|---|
| *C08G 18/66* | (2006.01) |
| *C08G 18/75* | (2006.01) |
| *G02B 1/04* | (2006.01) |
| *C08G 18/61* | (2006.01) |
| *C08G 18/48* | (2006.01) |
| *C08G 18/65* | (2006.01) |
| *B29D 11/00* | (2006.01) |
| *C08J 3/075* | (2006.01) |
| *C08K 5/13* | (2006.01) |

(52) U.S. Cl.
CPC .... *C08G 18/6674* (2013.01); *B29D 11/00038* (2013.01); *C08G 18/4808* (2013.01); *C08G 18/4833* (2013.01); *C08G 18/4837* (2013.01); *C08G 18/61* (2013.01); *C08G 18/6517* (2013.01); *C08G 18/6677* (2013.01); *C08G 18/758* (2013.01); *C08J 3/075* (2013.01); *C08K 5/13* (2013.01); *G02B 1/043* (2013.01); *C08G 2210/00* (2013.01); *C08J 2375/08* (2013.01)

(58) Field of Classification Search
CPC ........... C08G 18/6674; C08G 18/4837; C08G 18/61; C08G 18/6517; C08G 18/4808; C08G 18/4833; C08G 18/6677; C08G 18/758; C08G 2210/00; C08K 5/13; C08J 3/075; C08J 2375/08; G02B 1/043; B29D 11/00038
See application file for complete search history.

(56) References Cited

U.S. PATENT DOCUMENTS

| | | |
|---|---|---|
| 2012/0302656 A1 | 11/2012 | Rashid et al. |
| 2013/0274370 A1 | 10/2013 | Abdul et al. |

FOREIGN PATENT DOCUMENTS

| | | | |
|---|---|---|---|
| WO | WO-2011/051690 | 5/2011 | |
| WO | WO-2011/055108 | 5/2011 | |
| WO | WO-2012143695 A2 * | 10/2012 | ........... C08G 18/283 |

OTHER PUBLICATIONS

International Search Report and Written Opinion issued on PCT/GB2015/051960, dated Sep. 28, 2015.

* cited by examiner

*Primary Examiner* — Rabon A Sergent
(74) *Attorney, Agent, or Firm* — Foley & Lardner LLP

(57) ABSTRACT

The present invention provides a poly(ethylene) glycol based polyurethane polymer composition, particularly useful in the production of contact lenses. Generally the reactant mixture used to form the polymer includes a branched chain extender. There is also provided a method of manufacturing a contact lens formed from such a polymer.

3 Claims, No Drawings

POLYURETHANES FOR CONTACT LENSES

CROSS-REFERENCE TO RELATED APPLICATIONS

This application is a U.S. national phase application under 35 U.S.C. § 371 of International Application No. PCT/GB2015/051960, filed Jul. 7, 2015, which claims the benefit of priority to GB Application No. 1412053.9, filed Jul. 7, 2014, and GB Application No. 1417601.0, filed Oct. 6, 2014, all of which are hereby incorporated by reference in their entirety.

The present invention relates to articles of manufacture and processes for forming such. In particular, the present invention provides a polymer formed from a poly(ethylene glycol) reactant mixture, and generally comprising a branched chain extender. There is also provided an ophthalmic device such as a contact lens formed from such a polymer.

BACKGROUND TO THE INVENTION

Articles formed from known PEG based polyurethane polymers can be associated with poor clarity, in particular, such articles tend to be cloudy and/or opaque rendering such polymers unsuitable for use in the manufacture of optical devices such as contact lenses. The incorporation of silicone materials into mixtures to form PEG based polyurethanes can exacerbate these problems.

The incorporation of silicone containing materials into polyurethane based materials is known. For instance, WO2011/051690 discloses a polymer prepared by reacting a mixture comprising a polyol comprising three to five OH-terminated polyoxyalkylene groups, an isocyanate compound and optionally an OH-terminated chain extender. The polyol may be silicone containing. The reactant mixture typically comprises 10 to 95 wt % polyol, generally 30 to 70 wt % polyol. This would results in a thermoset polymer material.

Articles of manufacture formed from thermoplastic polyurethane materials are known.

WO2011/055108 discloses the use of polydialkyl siloxane diols in the preparation of polyurethane polymers useful in the manufacture of contact lenses. The use of polydialkyl siloxane diols to increase the oxygen permeability of the resultant polyurethane polymers is disclosed. However, it has been found that if a high content of silicone-containing compound is used in the manufacture of the polyurethane polymer far raising the Dk, the polymer becomes opaque or semi-opaque, rendering the polymer unsuitable in the field of contact lenses.

Generally the incorporation of high levels of silicone in polyurethane compositions has proved difficult whilst retaining clarity. In particular, increasing the siloxane level in known polymers to a level which effectively increases the oxygen throughput at the desired level is generally associated with the production of a cloudy or opaque article of manufacture following hydration. This renders the material unsuitable for use in the manufacture of ophthalmic devices such as contact lenses.

The present invention seeks to provide new silicone containing polyurethane-based materials that are suitable for use in the contact lens industry. The polyurethane-based materials are suited to both thermoplastic manufacturing processes and thermoset manufacturing processes, of the invention are copolymers that exhibit exemplary physical properties, in particular in terms of strength, oxygen permeability, shelf life stability and light transmissibility. In addition, the materials described herein are suitable for reaction cast moulding techniques that are generally used for manufacturing contact lenses that are thermoset as well as injection moulding/compression moulding techniques for the manufacture of contact lenses.

Silicone is hydrophobic and PEG is hydrophilic and as such, these two materials are mutually incompatible and if this incompatibility remains unaddressed this can potentially cause opacity in articles of manufacture formed from the materials. Also a reasonably high concentration of silicone is required to achieve the required/desired DK levels in articles of manufacture formed from the materials, in particular contact lenses. In the past the incorporation of high levels of silicone in polyurethane compositions has proved difficult whilst retaining clarity. In general, increasing the siloxane level in known polymers to 5 wt % or more is associated with the production of a cloudy or opaque article of manufacture following hydration. This renders the material unsuitable for use in the manufacture of ophthalmic devices such as contact lenses.

The transparency of polymers containing silicone is particularly low where the reactant mixture used to form the polymers includes a hydrophilic unit such as a PEG compound of moderately high molecular weight.

The quantity of a chain extender in the manufacture of a polymer intended for processing by injection moulding techniques would generally be limited by those skilled in the art. An increase in polymer chain length results in an increase in polymer chain entanglement generally associated with an increase in viscosity and may cause phase separation. Accordingly, the incorporation of a chain extender would generally be considered to result in an opaque polymer where hard blocks associate resulting in macrophase separation rendering it unsuitable for contact lenses produced by injection/compression moulding techniques.

Problems

Currently contact lenses are made by cast moulding thermoset resins (primarily acrylic based). This is a costly, time consuming, multistep process. It is thus desirable to generate a thermoplastic hydrogel material which can be thermally processed into a contact lens having physical properties similar to cast moulded lenses. The contact lenses made from acrylic based materials are generally associated with a relatively low DK which limits their performance on eye.

It has long been acknowledged that contact lenses having a high associated oxygen permeability, or DK, limit corneal hypoxia which is important for the health of the eye. Thus it is a desirable attribute to have a lens material with a high DK, ideally around 50 Barrer or more. Methacrylate based polymer hydrogels reported in the literature are known to have low DK. The DK of a contact lens is a function of diffusion of oxygen through the polymer matrix i.e., lens material and diffusion through water contained in the lens. Increasing the DK above 40 can be achieved by increasing the water content. However, this is known to have a negative effect on the lens properties, such as modulus and strength, making them unsuitable for use as functional contact lenses. To overcome this issue, silicone based compounds have been incorporated into these polymers.

However, it is known that incorporating hydrophobic silicone units into hydrophilic polymers, such as PEG based polyurethane polymers, results in materials which phase separate, on the macroscale, resulting in materials with poor transparency. The resultant materials are therefore unsuitable for the manufacture of contact lenses in particular those that are used for vision correction.

An additional problem caused by the incorporation of silicone into PEG based polyurethane polymers is the rearrangement and association of polymer chains of the resultant material due to low glass transition temperature and surface energy of the silicone. This can result in the material becoming more prone to distortion, and an increased proclivity towards phase separation when the material is hydrated, in particular when also heated (i.e. as experienced during standard sterilisation techniques). Standard sterilisation methods, such as moist heat sterilisation methods, generally employ temperatures over 100° C., typically 121 to 123° C. for a period of around 25 minutes. Known medical devices (e.g. contact lenses) made by using PEG based thermoplastic injection mouldable polymers tend to deform when exposed to such temperatures. Temperatures associated with high energy sterilisation techniques, such as pulsed UV techniques generally involve temperatures of 40 to 60° C. The exposure of known injection mouldable polymers to such high energy conditions may also lead to degradation of the polymers.

It is also difficult to form contact lenses having good clarity from known PEG based silicone-containing materials that have an appropriate shelf life required for the product. The shelf life stability is generally achieved through covalent cross linking. However, the greater the degree of crow-linking, the greater the modulus of the resultant material, and increasing the modulus can cause articles formed from the material to be uncomfortable to wear, and increase the risk of infection.

Contact lenses made from PEG based polyurethane polymers which do not contain silicone are also associated with poor stability and, as indicated above, the addition of substantial cross linking would be needed to make the lens stable for the period required by the industry. This will result in the rise of modulus which is likely to have negative impact on the eye of a wearer of this lens.

Surprisingly, through appropriate selection of reagents the present invention provides highly transparent polymers which comprise high levels of silicone.

STATEMENT OF INVENTION

Surprisingly, the present invention provides functional contact lenses that have the required stability and are comfortable to wear. This is achieved through appropriate selection of reactants and their concentrations within the polymer compositions that make the PEG based polyurethane contact lens materials, where the polymer compositions may or may not include a silicone component. The present invention provides highly transparent PEG polyurethane polymers which may comprise high levels of silicone, thereby solving both the incompatibility problem and providing high DK materials. Moreover the present invention teaches how to make PEG based polyurethane contact lens and materials which have an associated DK sufficient to ensure high on-eye comfort and which also have the desired/required shelf-life demanded by the industry.

According to a first aspect of the present invention there is provided a polyurethane polymer composition prepared by reacting a mixture comprising:
at least one poly (ethylene glycol) (PEG) compound,
at least one block copolymer of polyethylene oxide-propylene oxide-ethylene oxide and/or at least one PEG-PDMS-PEG copolymer diol,
at least one di- or poly isocyanate compound (which may be a blocked di- or poly-isocyanate compound),
0.5 to 4 wt % of at least one polyfunctional compound having an average functionality greater than 2, or a mixture of such polyfunctional compounds,
0.5 to 20 wt % of a chain extender having the structure of Formula B:

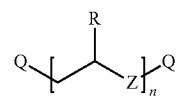

Formula B where Q represents COOH, OH, SH or $NH_2$;
Z represents C, C=O, S or N;
R represents an alkyl group (generally a small alkyl group having a carbon backbone of
1 to 5 carbon atoms), and
n represents an integer from 1 to 25, generally 2 to 5;
wherein the reactants are reacted under substantially anhydrous conditions.

According to one embodiment, the mixture consists essentially of the components specified above. Generally at least 90 wt % of the mixture is formed from the components specified above, typically at least 95 wt %, suitably at least 98 wt %.

Suitably the chain extender is di-propylene glycol. Generally the reactant mixture comprises 1 to 10 wt % di-propylene glycol.

Generally the mixture comprises 5 wt % or less of the sum of all compounds having an average functionality of greater than two.

The mixture may include at least one block copolymer of ethylene oxide-propylene oxide-ethylene oxide and at least one PEG-PDMS-PEG copolymer dial. Alternatively the mixture may include one of a block copolymer of ethylene oxide-propylene oxide-ethylene oxide and a PEG-PDMS-PEG copolymer diol.

According to a further aspect of the present invention there is provided a polyurethane polymer composition prepared by reacting a mixture comprising:
30 to 70 wt % of at least one PEG compound,
10 to 40 wt % of at least one block copolymer of ethylene oxide-propylene oxide-ethylene oxide,
10 to 30 wt % of at least one di- or poly isocyanate compound, generally at least one di-isocyanate compound,
0.5 to 4 wt % of at least one polyfunctional compound having an average functionality greater than 2, or a mixture of such polyfunctional compounds,
0.5 to 20 wt % of a chain extender having the structure of Formula B, such as di-propylene glycol (generally 1 to 10 wt % di-propylene glycol);
wherein the reactants are reacted under substantially anhydrous conditions.

Generally the mixture comprises at least 50 wt % PEG compound and block copolymer of ethylene oxide-propylene oxide-ethylene oxide.

According to a further aspect of the present invention there is provided a polyurethane polymer composition prepared by reacting a mixture comprising:
10 to 30 wt % of at least one PEG compound (generally 15 to 25 wt % of at least one PEG compound), 20 to 70 wt % of at least one PEG-PDMS-PEG copolymer diol (generally 40 to 60 wt % of at least one PEG-PDMS-PEG copolymer diol, typically 15 to 40 wt %), 10 to 30 wt % of at least one di- or poly isocyanate compound, generally at least one di-isocyanate compound, 0.5 to 4 wt % of at least one polyfunctional compound having an average functionality greater than 2, or a mixture of such polyfunctional compounds, 0.5 to 20 wt % of a chain extender having the structure of Formula B, such as di-propylene glycol (generally 1 to 10 wt % di-propylene glycol);

wherein the reactants are reacted under substantially anhydrous conditions.

A mixture of low, moderate and relatively high molecular weight PEGs may be employed.

Generally the mixture comprises at least 50 wt % PEG compound and PEG-PDMS-PEG copolymer diol, typically at least 60 wt %, suitably at least 65 wt %.

According to a further aspect of the present invention there is provided an article of manufacture formed from a thermoplastic polymer prepared from a mixture comprising:
a. a silicone containing macromer;
b. an isocyanate (which may be in the form of a blocked isocyanate);
c. a chain extender having the structure of Formula B:

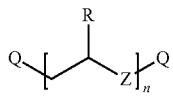

where Q represents COOH, OH, SH or $NH_2$;
Z represents C, C=O, S or N;
R represents an alkyl group (generally a small alkyl group having a carbon backbone of 1 to 5 carbon atoms), and
n represents an integer from 1 to 25, generally 2 to 5;

wherein the mixture comprises 5 wt % or less of the sum of all compounds having an average functionality of greater than two;

the isocyanate, silicone containing macromer and chain extender are reacted under substantially anhydrous conditions to complete the reaction.

Generally the silicone containing macromer comprises a PEG portion (typically the PEG portion being 10 wt % or more of the silicone containing macromer) and/or said mixture comprises a PEG compound. The silicone containing macromere may contain different chain lengths of PEG component and mixtures of such macromers may be used in the reacting mixture.

According to one embodiment, the mixture comprises a PEG compound.

According to one embodiment, the mixture comprises a polyfunctional compound comprising COOH, OH, SH, $NH_2$, NHR and/or NCO functional groups where R represents an alkyl group, said polyfunctional compound having an average functionality greater than 2. Typically the polyfunctional compound has a number average molecular weight of 1500 or less, preferably less than 300.

According to one embodiment, the mixture comprises a second chain extender comprising one or more of COOH, OH, SH, and $NH_2$ terminal groups.

According to one embodiment, the NCO:OH ratio in the reactant mixture is from 1:0.9 to 0.9:1.

According to one embodiment, the NCO:OH ratio in the reactant mixture is 1:more than 1.

Generally the thermoplastic polymer is partially cross-linked.

According to a second aspect of the present invention there is provided a process for preparing a polyurethane hydrogel, said process comprising:
i. preparing a mixture as described above
ii. allowing the mixture formed in step i. to react appropriately to form a cross-linked polyurethane xerogel;
iii. hydrating the xerogel using an aqueous medium to form a hydrogel.

A third aspect of the invention relates to a polymer obtainable by the above described process.

A fourth aspect of the present invention relates to a process for preparing an article of manufacture comprising the steps of:
i) preparing a mixture as described above,
ii) dispensing the reaction mixture formed in step i) into a mould;
iii) allowing the reaction mixture to react and cure (generally with the assistance of energy, in particular thermal energy or other means of radiation); and
iv) removing the article of manufacture from the mould.

The process may include the step of sterilising the moulded article through moist heat sterilisation techniques, or pulsed UV (PUV) sterilisation techniques.

Generally the article of manufacture is in the form of a medical device for use on or in a human or animal body. In particular, the article of manufacture may be in the form of an ophthalmic device, such as a contact lens (hard or soft), an intraocular lens, a corneal onlay, other ophthalmic devices (e.g., strips, or the like) used on or about the eye or ocular vicinity Including devices used for drug release.

According to one embodiment, the article of manufacture is a contact lens.

A further aspect of the invention relates to a polyurethane xerogel contact lens obtainable by the above process.

A fifth aspect of the present invention relates to a process for preparing a contact lens comprising the steps of:
1. preparing a mixture as described above,
2. dispensing the reaction mixture formed in step 1 into a contact lens mould;
3. allowing the reaction mixture to react and cure (generally with the assistance of energy, in particular thermal energy or other means of radiation);
4. removing the contact lens from the mould; and
5. hydrating the contact lens, optionally in the presence of a surface active agent and/or hydrophilic compound, such as, for instance, a polysorbate, poloxamer or poly (glycerol mono methacrylate) or mixture thereof.

Generally the contact lens mould is a two part contact lens mould.

A sixth aspect of the present invention relates to an article of manufacture comprising a polymer as described above.

The article of manufacture is generally reaction cast moulded (RCM).

Alternatively, according to some embodiments, the article of manufacture may be injection/compression moulded (IM).

A seventh aspect of the present invention relates to the use of a polymer as described above in the preparation of a contact lens.

DEFINITIONS

The functionality of a compound is used to refer to the number of functional groups that are capable of reacting in the reaction mixture. As such a "diol" refers to a compound comprising two hydroxyl functional groups capable of reacting in the reaction mixture and a "di-isocyanate" refers to a compound comprising two NCO functional groups capable of reacting in the reaction mixture.

"DK" is a measure of the oxygen permeability of a material provided in Barrer units where 1 Barrer=$10^{-11}$ $cm^2 \cdot mL \cdot mmHg$.

The term "hydrogel" is used herein to refer to a polymer comprising 10 wt % or more water. Generally, a hydrogel in an aqueous medium will absorb water and retain its original dry shape but it will be enlarged. It will not dissolve in water to form a fluid unless it is significantly degraded.

The term "xerogel" is used to refer to a polymeric material which may form a hydrogel upon contact with sufficient water. Generally a xerogel is dry and comprises less than 5 wt. % water.

The terms "substantially anhydrous" and/or "dehydrated" are generally used herein to refer to conditions in which the amount of water in the reactant mixture is less than about 0.3 wt. %, suitably less than about 0.1 wt. %, typically less than about 0.05 wt. %.

The term "small alkyl group" refers to an alkyl group having a carbon backbone of 1 to 6 carbon atoms, typically 1 to 4 carbon atoms.

The term "thermoplastic" is used to refer to a composition which melts and flows at a temperature lower than the temperature at which it degrades.

The term "thermoset" is used to refer to a composition which melts at a temperature higher than the temperature at which it degrades.

The term "reaction cast moulding" (RCM) is used to refer to moulding techniques which involve the steps of mixing the reactants together, dispensing the reactant mixture into a mould and allowing the reactant mixture to react and cure (generally with the assistance of energy, in particular thermal energy or radiation).

The term "injection moulding" (IM) is used to refer to moulding techniques which involve the steps of mixing the reactants together and allowing a polymerisation reaction to complete and form a thermoplastic polymer prior to dispensing into a mould cavity to form an article. The thermoplastic composition is generally injected through a flow or fluid channel into a moulding cavity.

The term "blocked" compound is used to refer to a compound having one or more functional groups which are unable to react in the reactant mixture before being activated, where activation generally occurs through the exposure of the blocked compound to known thermal and/or chemical conditions to generate compounds able to react under the polymerization conditions of the present invention. Generally isocyanate groups are generated through the activation process. The activation is predictable and reliable. Generally the functional groups are blocked by being chemically bonded to a blocking compound. The blocking compound is generally unreactive in the reactant mixture under the reaction conditions used to form the polymer of the invention. The blocking compound is reliably and predictably removable under pre-determined conditions, typically thermal and/or chemical conditions. Where the blocked functional group is an isocyanate group, the blocking compound may comprise a 3,5-dimethylpyrazole group (DMP). The blocked compound may be activated prior to the formation of the reactant mixture, during the mixing of the reactant mixture or after mixing has taken place.

The term "partial cross-linking" is used to refer to compositions which are thermoplastic but which include cross-linking between some polymer chains and/or branching between some polymer chains. Generally cross-linking is covalent, but there may also be some degree of polymer chain entanglement. Generally a partially cross-linked material comprises some covalent cross-linking. Typically less than 20% of the polymer chains in a partially cross-linked composition are covalently cross-linked.

The term "the polyurethane materials of the present invention" is used to refer to a material comprising the polyurethane xerogel or hydrogel of the present invention, including an article of manufacture comprising the polyurethane xerogel or hydrogel of the present invention.

A "medical device", as used herein, refers to a device or a part thereof having one or more surfaces that contacts tissue (including skin), blood, or other bodily fluids of patients in the course of their operation or utility.

An "ophthalmic device", as used herein, refers to a contact lens (hard or soft), an intraocular lens, a corneal onlay, other ophthalmic devices (e.g., strips, or the like) used on or about the eye or ocular vicinity.

"Biocompatible", as used herein, refers to a material or surface of a material, which may be in intimate contact with tissue, blood, or other bodily fluids of a patient for an extended period of time without significantly damaging the tissue or cell environment, in particular the ocular environment and without significant user discomfort.

"Physical interactions" or "physical forces" are used to refer to non-covalent interactions including polymer chain entanglement and hydrogen bonding.

Number average molecular weights described in the text are those determined experimentally within the applicant's laboratories by end group analysis and/or provided by the manufacturer.

The term stability is used to describe the physical structural integrity of a contact lens e.g. its, diameter, base curve that substantially remain unchanged during storage. (According to one embodiment, the diameter of a stable contact lens does not change more than 1.4% and the base curve of a stable contact lens does not change more than 2.3% following storage for one month or more under normal storage conditions as per industry standard. Alternatively, the stability of articles of manufacture may be tested using an accelerated test carried out at an elevated temperature.

The term polyol is used to describe the compounds having more than two hydroxyl reactive groups, generally the polyol has a number average molecular weight less than or equal to 1000.

The term "macropolyol" is used herein to refer to a compound having more than 2 available hydroxyl groups linked to a macromer. Generally the macropolyol has a number average molecular weight greater than 1000.

As used herein, the term "macromer" (also referred to as "macromonomer") refers to a polymer or oligomer that has one or more functional group(s) capable of participating in further polymerisation.

Polymer Composition

According to a first aspect of the present invention there is provided a polyurethane polymer composition prepared by reacting a mixture comprising:
at least one PEG compound,
at least one block copolymer of ethylene oxide-propylene oxide-ethylene oxide and/or at least one PEG-PDMS-PEG copolymer diol,
at least one di- or poly isocyanate compound (which may be a blocked di- or poly-isocyanate compound), 0.5 to 4 wt % of at least one polyfunctional compound having an average functionality greater than 2, or a mixture of such polyfunctional compounds, 0.5 to 20 wt % of at least one chain extender having the structure of formula B, suitably di-propylene glycol (generally 1 to 10 wt % di-propylene glycol);

wherein the reactants are reacted under substantially anhydrous conditions.

The reaction mixture generally includes tertiary hydrogen containing components (e.g., DPG, PEG-PPG-PEG).

Typically the polyfunctional compound is a polyhydroxy compound, typically having a number average molecular weight of less than or equal to 1000. Generally the reactant mixture comprises at least 0.6 wt %, suitably at least 0.9 wt % of the polyfunctional compound.

According to a further aspect of the present invention there is provided a polyurethane polymer composition prepared by reacting a mixture comprising:

30 to 70 wt % of at least one PEG compound, 10 to 40 wt % of at least one block copolymer of ethylene oxide-propylene oxide-ethylene oxide, 10 to 30 wt % of at least one di- or poly isocyanate compound, generally at least one di-isocyanate compound, 0.5 to 4 wt % of at least one polyfunctional compound having an average functionality greater than 2, or a mixture of such polyfunctional compounds, 0.5 to 20 wt % of at least one chain extender having the structure of formula B, suitably di-propylene glycol (generally 1 to 10 wt % di-propylene glycol);

wherein the reactants are reacted under substantially anhydrous conditions.

The reactant mixture may comprise 0.5 to 1.5 wt % polyfunctional compound, typically 0.7 to 1 wt %.

The polyfunctional compound may be a polyhydroxy compound.

According to a further aspect of the present invention there is provided a polyurethane polymer composition prepared by reacting a mixture comprising:

10 to 30 wt % of at least one PEG compound (generally 15 to 25 wt % of at least one PEG compound), 30 to 70 wt % of at least one PEG-PDMS-PEG copolymer diol (generally 40 to 60 wt % of at least one PEG-PDMS-PEG copolymer diol, typically 45 to 55 wt %), 10 to 30 wt % of at least one di- or poly isocyanate compound, generally at least one di-isocyanate compound, 0.5 to 4 wt % (generally 2 to 3 wt %) of at least one polyfunctional compound having an average functionality greater than 2, or a mixture of such polyfunctional compounds, 0.5 to 20 wt %, di-propylene glycol (generally 1 to 10 wt % di-propylene glycol);

wherein the reactants are reacted under substantially anhydrous conditions.

The reactant mixture may comprise 1.5 to 3.0 wt % polyfunctional compound, typically 2 to 3 wt %.

The polyfunctional compound may be a polyhydroxy compound.

Incorporation of polyfunctional compounds in the polyurethane compositions is required for retaining the appropriate stability. However if the concentration of these polyfunctional compounds is increased within the composition on polymerisation it can form domains that can result in opacity in the article of manufacture in particular. This renders the material unsuitable for use in the manufacture of ophthalmic devices such as contact lenses.

In addition, the incorporation of high levels of silicone in polyurethane compositions is associated with a decrease of the clarity of articles of manufacture formed from the polymer. In particular, increasing the siloxane level in known polymers to 5 wt % or more is generally associated with the production of a cloudy or opaque article of manufacture following hydration. This problem is particularly marked for articles of manufacture formed from mixtures including 20 wt % or more siloxanes. Such articles of manufacture become opaque upon hydration and are thus completely unsuitable for use in vision correction and for use as contact lenses.

Whilst the inventors do not wish to be bound by theory, it is hypothesised that the cause of opacity is due to phase separation that may result when domains within a polymer matrix associate through interaction with each other. These domains are likely to be those that result due to the reaction of multifunctional compound with other co-reactants. The opacity increases as the domain size increases. Similarly the PDMS chains present in the overall polymer may also interact through hydrophobic interactions to result in phase separation. In general if the size of such domains is greater than the wavelength of light then the domains cause articles of manufacture formed from such materials to become opaque on hydration. The transparency of polymers is particularly low where the reactant mixture used to form the polymers includes a siloxane material and a hydrophilic unit such as a PEG compound due to lack of compatibility. To overcome this modified siloxane compounds (i.e., PEG-PDMS-PEG type) are used in the composition of the present invention. In addition, the incorporation of di-propylene glycol (DPG) reduces the intermolecular interactions and/or the interdomain interactions thereby greatly reducing or eliminating the opacity in the article post hydration.

The incorporation of a chain extender such as DPG within the compositions of the present invention allows a high concentration of multifunctional compound (e.g., polyols such as IMP) to be accommodated within the composition without phase separation. As noted above, such phase separation would cause a lack of transparency or opacity in the resultant product.

In addition, the incorporation of a chain extender such as DPG allows the modulus of resultant articles to remain relatively low, and it is hypothesised this may be due to reduced intermolecular interactions.

The high level of chemical cross linking caused by relatively high concentrations of polyfunctional compounds results in greater structural stability and prolonged shelf life.

Surprisingly, despite the incorporation of 0.5-4 wt % of least one polyfunctional compound, the transparency of the materials of the present invention is very high. It is hypothesised that the chain extender remains distributed randomly within the polymeric chains/matrix upon and following polymerisation of the mixture and that the chain extender stops the chains/domains coalescing, thus resulting in the material remaining clear. The materials of the present invention are accordingly very suitable for use in the manufacture of ophthalmic devices such as contact lenses.

Articles of manufacture of the present invention may be injection moulded. Polymers suitable for injection moulding techniques must be thermoplastic and must flow under elevated temperatures but below the degradation temperature. The incorporation of chain extenders, such as those of Formula B, result in an increase in polymer chain length, and thus an increase in polymer chain entanglement. Accordingly, the incorporation of a chain extender would not generally be considered for polymers intended for processing by injection moulding as it would be considered that this would lead to an increase in processing temperature, and an increase in viscosity of the resultant polymer. The increase in processing temperature may also cause degradation.

The specific components used in the manufacture of the polymers of the present invention allow the manufacture of a polymer which is transparent and has good associated biocompatibility. The incorporation of a chain extender having the structure of Formula B is believed to reduce or prevent the polymer chains from coalescing meaning that the transparency of the polymer remains high despite the incorporation of relatively high proportions of polyol/macropolyol and siloxane component.

The water content of the materials of the present invention is high, generally 15 wt % or more, suitably 20 wt % or more, typically 50 wt % or more, up to 70 wt % or more. The biocompatibility of the materials of the present invention is accordingly high, and the risk of irritation or inflammation upon contact with human or animal tissue is significantly decreased.

The oxygen permeability of the materials of the present invention is comparatively high, generally 50 Barrer or more, suitably 60 Barrer or more; in particular for the compositions of the present invention that contain siloxane as a component.

It is believed that the presence of physiochemical interactions (in particular, covalent and physical interactions) in the article made from the polymer of the present invention allows the article (such as contact lens) (after hydration) to have high associated dimensional and structural stability for prolonged periods of time, thereby providing the appropriate shelf life for the product. In particular, articles of manufacture of the present invention can maintain dimensional and structural stability when subjected to the temperatures used in moist heat sterilisation and/or to the conditions associated with PUV sterilisation. The degree of cross-linking in the polymer of the present invention generally allows the retention of thermoplasticity.

According to one embodiment, the reactant mixture comprises at least one block copolymer of ethylene oxide and propylene oxide i.e. PEG-PPG-PEG.

Alternatively or additionally the reactant mixture may comprise at least one PEG-PDMS-PEG copolymer diol According to one embodiment, the NCO:OH ratio in the reactant mixture is from 1:0.9 to 0.9:1. Generally the reactant mixture used to form the polymers of the present invention has an excess of isocyanate. According to one embodiment, the NCO:OH ratio in the reactant mixture is 1 or more than 1, generally 1:0.95 to 1.05.

Generally, the reactant mixture used to form the xerogel of the present invention has an associated OH:NCO ratio of 1:more than 1; typically 1:1.05 or more; suitably 1:1.5. It is believed that the degree of cross-linking is controlled at least in part by controlling the NCO:OH ratio in the reactant mixture.

Alternatively the reactant mixture used to form the polymers of the present invention may have an excess of hydroxyl, typically an NCO:OH ratio of 1:1.2; suitably 1:1.5, or the NCO:OH ratio may be around 1:1.

Where the polyfunctional compound is a polyol/macropolyol, its inclusion results in at least three hydroxyl groups in the reactant mixture capable of reacting under the polymerisation conditions.

As such the inclusion of such monomers creates cross-links between the polymer chains within the polymer matrix.

According to one embodiment, the polymeric materials of the invention are thermoplastic, i.e. the polymer softens and flow when exposed to heat and pressure. The polymers of the present invention are generally partially cross-linked, that is some but not all of the polymer chains are linked to another polymer chain through covalent cross-linking. It is believed this is in part due to controlling the NCO:OH ratio so that the reactant mixture of the present invention comprises OH groups in excess of NCO groups.

The silicone containing polymers of the present invention exhibit high thermal stability and resistance to oxidative degradation. Generally the polymer compositions of the present invention have a melting point of at least 150° C., typically at least 200° C., suitably at least 250° C.

The polymer of the present invention generally has an associated flow temperature of over 110° C.; typically at least 140° C., suitably at least 160° C. The polymers of the present invention are associated with a melt flow index of more than three (2.16 kg/180° C.) at temperatures of 180° C. or more.

The compositions of the present invention are water insoluble. The thermoplastic compositions of the present invention are generally at least partially soluble in a compatible organic solvent.

Chain Extender of Formula B

The polymer of the present invention is formed from a reactant mixture comprising a chain extender having the structure of Formula B:

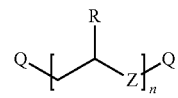

Where Q represents COOH, OH, SH or NH$_2$;
Z represents C, C=O, S or N;
R represents an alkyl group (generally a small alkyl group having a carbon backbone of 1 to 5 carbon atoms), and
n represents an integer from 1 to 25, generally 1 to 5.

According to one embodiment, the chain extender has the structure of Formula Bi:

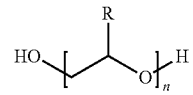

According to a further embodiment, the chain extender has the structure of Formula Bii:

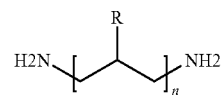

The terminal groups of the chain extender may be the same or different.

According to one embodiment, R represents a methyl, ethyl or propyl group, generally a methyl group.

According to one embodiment, n represents 2 or 3.

The branched chain extender may be propylene glycol, dipropylene glycol (DPG) or tripropylene glycol (TPG).

Generally the reactant mixture comprises at least 0.5 wt % of at least one chain extender having the structure of Formula B (generally DPG); typically at least 2 wt %; suitably at least 3 wt %; more suitably at least 4 wt %.

Suitably, the reactant mixture comprises 10 wt % or less chain extender(s) of Formula B, typically 7.5 wt % or less, generally 5 wt % or less.

According to one embodiment, the reactant mixture comprises 2 to 20 wt % of at least one chain extender having the structure of Formula B (generally DPG); typically 2 to 15 wt %; generally 3 to 10 wt %; suitably 4 to 7 wt %.

According to one embodiment, the reactant mixture comprises 2 to 3 wt % chain extender(s) of Formula B, optionally in combination with a second chain extender, in particular as described below.

The reactant mixture of the present invention may comprise more than one chain extender of Formula B.

The chain extender of Formula B (generally DPG), tends to reduce opacity from articles of manufacture formed from the polymer of the present invention.

According to a further aspect of the present invention there is provided a polyurethane polymer composition prepared by reacting a mixture comprising:
  30 to 70 wt % of at least one PEG compound,
  10 to 40 wt % of at least one block copolymer of ethylene oxide-propylene oxide-ethylene oxide,
  10 to 30 wt % of at least one di- or poly-isocyanate compound, generally at least one di-isocyanate compound,
  0.5 to 4 wt % (generally 0.5 to 1.5 wt %) of at least one polyfunctional compound having an average functionality greater than 2, or a mixture of such polyfunctional compounds,
  0.5 to 20 wt % chain extender of Formula B, suitably di-propylene glycol (generally 1 to 10 wt % di-propylene glycol);
wherein the reactants are reacted under substantially anhydrous conditions.

The reactant mixture may comprise less than 10 wt % chain extender; typically 1 to 7 wt % chain extender.

According to a further aspect of the present invention there is provided a polyurethane polymer composition prepared by reacting a mixture comprising:
  10 to 30 wt % of at least one PEG compound (generally 15 to 25 wt % of at least one PEG compound),
  30 to 70 wt % of at least one PEG-PDMS-PEG copolymer diol (generally 40 to 60 wt % of at least one PEG-PDMS-PEG copolymer diol, typically 45 to 55 wt %),
  10 to 30 wt % of at least one di- or poly isocyanate compound, generally at least one di-isocyanate compound,
  0.5 to 4 wt % (generally 1 to 3 wt %, typically 2 to 3 wt %) of at least one polyfunctional compound having an average functionality greater than 2, or a mixture of such polyfunctional compounds,
  0.5 to 20 wt % chain extender of Formula B, suitably di-propylene glycol (generally 1 to 10 wt % di-propylene glycol);
wherein the reactants are reacted under substantially anhydrous conditions.

The reactant mixture may comprise less than 5 wt % chain extender of Formula B (generally DPG); typically less than 2 wt %.

Poly(Ethylene Glycol)

The present invention involves the use of at least one poly(ethylene glycol) (PEG). The PEG is preferably a pharmaceutical grade poly(ethylene glycol) with a molecular weight of approximately as described below. PEG is a main functional constituent of the composition of the present invention. In addition, PEG also plays a key role in controlling the hydrophilicity (affinity for water) of the polymer composition of the present invention and of the surface of items formed therefrom (in particular medical devices such as contact lenses), which in turn governs the biocompatibility of the resultant polymer composition and items formed therefrom with biological tissue and fluids.

Suitably the PEG has a number average molecular weight of about 200 to about 30,000, more suitably from about 500 to about 20,000, typically 2000 to 12000, generally 2000 to 10000, preferably 3000 to 9000, advantageously 2000 to 8000.

According to one embodiment, the reactant mixture comprises more than one PEG compound.

According to one embodiment, the reactant mixture comprises a PEG compound having a number average molecular weight of 2000 to 5000, generally 3000 to 4000, suitably 3000 to 3500, more suitably around 3350.

According to one embodiment the PEG compound has a number average molecular weight of about 2000 to about 7000. According to one aspect of the present invention the PEG has a molecular weight of 5000 to 6000, suitably 5500 to 6000. Preferably the PEG compound has a number average molecular weight of around 6000+/−250, and/or around 3350+/−250.

According to an aspect of the present invention there is provided a polyurethane polymer composition prepared by reacting a mixture comprising:
  30 to 70 wt % of at least one PEG compound,
  10 to 40 wt % of at least one block copolymer of ethylene oxide-propylene oxide-ethylene oxide,
  10 to 30 wt % of at least one di- or poly isocyanate compound, generally at least one di-isocyanate compound,
  0.5 to 4 wt % (generally 0.5 to 1.5 wt %) of at least one polyfunctional compound having an average functionality greater than 2, or a mixture of such polyfunctional compounds,
  0.5 to 20 wt % chain extender of Formula B (generally 1 to 10 wt % di-propylene glycol);
wherein the reactants are reacted under substantially anhydrous conditions.

The reactant mixture may comprise at least one PEG compound having a number average molecular weight greater than 5000.

In one embodiment, the PEG is PEG 6000 (where the numbers represent the number average molecular weight).

According to one embodiment of the present invention, all PEG compounds used to form the composition of the present invention have a molecular weight of 5000 to 6000, suitably 5500 to 6000.

Alternatively, the composition of the present invention may include a PEG compound as described above and a second PEG compound which may have a molecular weight higher or lower than that described above, typically a second PEG compound having a molecular weight lower than that described above.

According to a further embodiment of the present invention, the composition comprises a first low molecular weight PEG compound (LMW PEG) and a second high molecular weight PEG compound (HMW PEG). Suitably the LMW PEG has molecular weight less than 4500, typically from about 2000 to about 4000, generally 3500 to 4000. Suitably the HMW PEG has molecular weight greater than 5000, typically from about 5000 to about 7000, generally 5500 to 6500. According to one embodiment, the composition comprises a LMW PEG compound having a molecular weight of 3000 to 4000 (generally around 3300 to 3400) and a HMW PEG compound having a molecular weight of 5500 to 6500.

Generally the HMW PEG compound has a number average molecular weight of 6000+/−250.

Preferably, the reactant mixture comprises from about 10 to about 95 wt % PEG, typically from about 30 to about 70 wt % PEG.

According to one embodiment the reactant mixture comprises from about 10 to about 95 wt % PEG having a molecular weight of 2000 to 9000, generally 5000 to 7000, typically from about 30 to about 70 wt % PEG having a number average molecular weight of 5000 to 7000.

Alternatively or additionally the reactant mixture may comprise from about 10 to about 50 wt % PEG having a number average molecular weight of 4500 or less, typically from about 5 to about 50 wt % PEG having a number average molecular weight of 4500 or less.

According to one embodiment, the reactant mixture may comprise 5 to 50 wt % of a first PEG compound having a number average molecular weight of 4000 or less and 20 to 50 wt % of a second PEG compound having a molecular weight of 5000 or more.

According to one embodiment of the present invention, the first PEG is generally PEG 3350 and/or PEG 2050 and the second PEG is selected from the group consisting of PEG 6000 and PEG 8000 (where the numbers represent the number average molecular weight).

The reactant mixture may comprise one or more silicone containing PEG compounds in particular PEG compounds including a siloxane portion preferably in the form of PEG-PDMS-PEG.

According to one embodiment, the poly(ethylene glycol) may be used in an amount of from about 1 to about 80 wt % of the reactants; generally from about 1 to about 25 wt %; suitably from about 3 to about 20 wt %; more suitably from about 3 to about 18 wt %. According to one embodiment, the reactant mixture comprises 5 to 6 wt %.

Where the PEG compound is present in amounts of less than 10 wt %, the reactant mixture generally includes a silicone compound comprising a PEG portion.

Typically, the molecular weight of the poly(ethylene glycol)(s) used to form the polymer of the present invention is/are less than 10000, generally less than 7000. Suitably the molecular weight of the poly(ethylene glycol)(s) used to form the polymer of the present invention is from about 200 to about 7000; generally from about 400 to about 7000.

According to one embodiment more than one poly(ethylene glycol) of differing molecular weights are used.

According to one embodiment, the reactant mixture of the present invention includes a mixture of PEG compounds with the first PEG compound having an average number molecular weight of 5000 to 7000, generally 5000 to 6500, a second PEG compound having an average number molecular weight of 1000 to 5000; a third PEG compound having an average number molecular weight of 100 to 1000; generally 100 to 500, suitably around 200.

According to one embodiment, the reactant mixture of the present invention further includes a third PEG compound having an average number molecular weight of 2500 to 4500, generally 3000 to 4000, suitably 3300 to 3600.

Alternatively, the reactant mixture may comprise a single PEG compound, in particular where the silicone compound includes a PEG portion. In such embodiments, the PEG compound typically has an average number molecular weight of 2500 to 7000, generally 3000 to 4000, suitably 3300 to 3600.

The use of PEG compounds having more than one molecular weight in the composition may be one way of ensuring compatibility of the various components of the composition to be maintained, including the silicone containing macromers.

In one embodiment, the reactant mixture comprises three PEG compounds having a number average molecular weight of PEG 5500 to 6000 (typically PEG 5761), PEG 2000 to 4000 (typically PEG 3433) and PEG 100 to 300 (typically PEG 200) respectively.

In a further embodiment, the reactant mixture comprises one PEG component having a number average molecular weight of 3000 to 3500 (typically PEG 3350) and additional PEG compounds of number average molecular weight of around 2000 and 200.

Typically, the poly(ethylene glycol) is used in an amount of from about 5 to about 80 wt % of the reactants, generally from about 10 to about 70 wt %, suitably from about 10 to about 25 wt %, more suitably, from about 15 to about 20 wt % of the reactants.

Inclusion of Silicone

The polymeric material of the present invention may be prepared from the reactant-mixture comprising at least one silicone macromer, generally at least one poly (ethylene glycol) (PEG)-polydimethylsiloxane (PDMS)-poly (ethylene glycol) (PEG) copolymer diol. According to one embodiment, the PEG compound includes a siloxane portion. Alternatively or additionally, the reactant mixture may comprise one or more siloxane macromers of the type PEG-PDMS-PEG.

According to one embodiment, the reactant mixture may comprise one or more additional silicone containing compounds, in particular one or more of dimethylsiloxane-ethylene oxide block/graft copolymers, ethylene oxide-dimethylsiloxane-ethylene oxide block polymers and poly dimethylsiloxane dicarbinol(mono) terminated compounds.

In the past the incorporation of high levels of silicone in polyurethane compositions has proved difficult whilst retaining clarity. In particular, increasing the siloxane level in known polymers to 5 wt % or more, is generally associated with the production of a cloudy or opaque article of manufacture following hydration. This renders the material unsuitable for use in the manufacture of ophthalmic devices such as contact lenses.

The transparency of polymers is particularly low where the reactant mixture used to form the polymers includes a siloxane material and a hydrophilic unit such as a PEG compound. Whilst the inventors do not wish to be bound by theory, it is hypothesised that the increase in opacity may be due to coalescence and/or mismatch in solubility parameters of the polymer chains which drives the polymer system towards macrophase separation of the siloxane and hydrophilic units. Surprisingly, despite the incorporation of high levels of silicone, and generally a PEG containing macromer, and optionally a separate PEG compound, the transparency of the materials of the present invention is very high. It is hypothesised that the branched chain extender stops the chains coalescing thus resulting in the material remaining clear. The materials of the present invention are suitable for use in the manufacture of ophthalmic devices such as contact lenses.

In general, silicone hydrogel based lenses are weaker in strength than those based on non silicone hydrogels due to lower cohesive energy density of the silicones. Also articles formed from linear silicone hydrogel polymers are relatively weaker than cross linked polymers. This is because in the linear polymers, the strength largely comes from hydrogen bonding between the interacting groups (which is much weaker than a chemical bond). These interacting groups include the urethane segments within the polymer backbone. The higher the urethane bonds within the polymer backbone the higher the strength, therefore the use of lower molecular weight PEGs affords more urethane segments after reacting with the isocyanate, hence lenses with appropriate strength can be achieved. But in addition, the higher concentration of urethane hard segments can associate to form aggregates (domains) in the soft segment matrix, which also become more self-associated in the process. These phenomena give rise to detectable hetrophase morphology in polyurethanes, resulting in opacity in the hydrated polymers if the domain size gets bigger than wave length of light. However in the present invention surprisingly, the opacity due to domain formation does not occur despite the high concentration of the urethane groups that arise as a result of reacting lower molecular weight PEGS and an isocyanate compound.

Moreover, the reactant mixture of the present invention affords compatibility, as well as allowing the overall silicone content to be surprisingly high whilst retaining good transparency, light transmission properties. The relatively high silicone content of the final polymer, allows the final polymer to have the desired material properties, typically including a relatively high DK required for ocular health.

According to one embodiment, the reactant mixture may comprise 0 to 70 wt % silicone containing compound; generally 10 to 60 wt %; suitably 40 to 60 wt %.

Generally the silicone compound/macromer has a number average molecular weight of 500 to 5000, typically 1000 to 3000, suitably 1500 to 3000, more suitably 2000 to 3000. According to one embodiment, there are two or more silicone macromers having number average molecular weights of 1000 to 3000, typically 1000 to 2000.

According to one embodiment, the silicone macromers have number average molecular weights of less than 6000; typically less than 3000, generally 2500 or less.

The reactant mixture may comprise more than one silicone containing compound.

According to one embodiment, the PEG-PDMS-PEG copolymer diol includes 10 wt % or more PDMS portion; typically 20 wt % or more; generally 30 wt % or more.

According to one embodiment, the reactant mixture comprises more than one PEG-PDMS-PEG copolymer diol.

The PEG-PDMS-PEG copolymer diol may have the structure of Formula A:

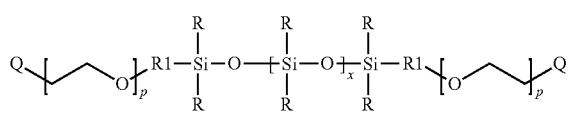

where each Q group independently represents a COOH, OH, SH, $NH_2$, NHR or NCO group; each R group independently represents a hydrocarbyl group, generally an alkyl group (suitably a small alkyl group such as methyl, ethyl, propyl, butyl group), each $R_1$ group independently represents a hydrocarbyl group, generally a small alkyl group, in particular methyl, each p is independently an integer from 0 to 110 (generally 1 to 100) and x is an integer from 0 to 324 (generally 1 to 100).

Generally Q represents OH or $NH_2$, typically OH and other groups capable of reacting within the reaction mixture.

Typically each R independently represents an alkyl group, generally a small alkyl group having a carbon backbone of 1 to 5 carbon atoms. According to one embodiment, each R group independently represents methyl, ethyl, propyl or butyl, generally methyl or ethyl. R may be a pendent group or part of the backbone.

According to one embodiment, the PEG portion of the silicone compound of Formula A may include branching. The branches may have structure similar to silicone macromer and/or these pendant branches may be hydrophilic polyoxy ethylene chains.

Generally each p is independently an integer from 1 to 50, typically 1 to 25, suitably 5 to 15, more suitably 10.

Suitably x is an integer from 1 to 50, typically 10 to 40, generally 20 to 30, more suitably 25.

According to one embodiment, the or each of the silicone compounds has a silicone content of 30 wt % or more, generally 40 wt % or more, suitably 50 wt % or more, more suitably around 60 wt %.

The, or each of the silicone compounds generally has a silicone content of 30 to 70 wt %; typically 55 to 65 wt %.

Suitable compounds are available from Siltech Corporation under the trade name Silsurf. Silsurf (Silsurf 2510 being an example) is of Formula A above where each R group represents a methyl group, x is 25 and p is 10.

The PEG-PDMS-PEG copolymer diol may have the structure below where n represents an integer from 5 to 20 (typically 10 or 15) and m represents an integer from 5 to 15 (typically 8 or 10). According to one embodiment, the, or one of the PEG-PDMS-PEG copolymer diols is of the structure below where n is 15 and m is 8 (available from Silsurf under the trade name Silsurf 1508), or where n is 10 and m is 10 (available from Silsurf under the trade name Silsurf 1010)

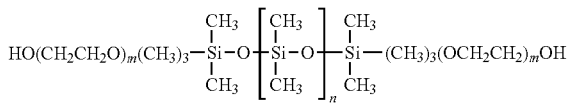

Additionally or alternatively the reactant mixture may comprise one or more compounds according to Formula VI or Formula VII:

Formula VI

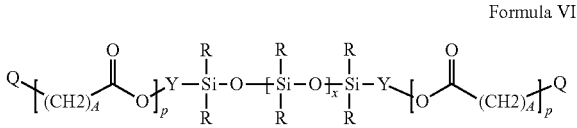

where each Q group independently represents a COOH, OH, SH, $NH_2$, NHR or NCO group (generally OH or NH2); each R group independently represents an alkyl group, in particular a small alkyl group, typically methyl, Y represents an alkyl group, p is an integer from 0 to 110 (generally from 1 to 110), x is an integer from 0 to 324 (generally from 1 to 324) and A is an integer from 1 to 25.

Generally the reactant mixture comprises over 30 wt % silicone containing macromer, typically at least 35 wt %, suitably at least 40 wt %.

Generally the reactant mixture may comprise 20 to 60 wt % silicone compound; generally 40 to 60 wt % silicone compound; suitably 50 to 55 wt % PEG-PDMS-PEG copolymer diol. In general, silicone hydrogel based lenses are weaker in strength than those based on non silicone hydrogels due to lower cohesive energy density of the silicones. Also articles formed from linear silicone hydrogel polymers are weak compared to cross linked polymers. This is because in the linear polymers, the strength largely comes from hydrogen bonding between the interacting groups (which is much weaker than a chemical bond). These interacting groups include the urethane segments within the polymer backbone. The higher the urethane bonds within the polymer backbone the higher the strength, therefore the use of lower molecular weight PEGs affords more urethane segments after reacting with the isocyanate, hence lenses with appropriate strength can be achieved. But in addition, the higher concentration of urethane hard segments can associate to form aggregates (domains) in the soft segment matrix, which also become more self-associated in the process. These phenomena give rise to detectable hetrophase morphology in polyurethanes, resulting in opacity in the hydrated polymers if the domain size gets bigger than wave length of light. However in the present invention surprisingly, the opacity due to domain formation does not occur despite the high concentration of the urethane groups that arise as a result of reacting lower molecular weight PEGs and an isocyanate compound. This may be due to the incorporation of DPG in the reactant mixture.

The use of PEG compounds having more than one molecular weight in the composition may be one way of ensuring compatibility of the various components of the composition is maintained, including the silicone containing components.

Moreover, the reactant mixture of the present invention affords compatibility, as well as allowing the overall silicone content to be surprisingly high whilst retaining good transparency and light transmission properties. The relatively high silicone content of the final polymer, allows the final polymer to have the desired material properties, typically including a relatively high DK required for ocular health.

In one embodiment, the reactant mixture comprises three PEG-PDMS-PEG copolymer diols having a number average molecular weight of 1000 to 2000 (typically Silsurf 1010), 1000 to 2000 (typically Silsurf 1508) and 2000 to 3000 (typically Silsurf 2510).

Use of more than one silicone macromer within the reactant mixture allows a high concentration of overall silicone content whilst maintaining transparency which affords contact lenses having a relatively high DK useful in promoting ocular health.

Isocyanate

The polymer composition of the invention is prepared using at least one isocyanate, typically at least one di-isocyanate. Generally, the di-isocyanate is an organic aliphatic di-isocyanate. The di-isocyanate performs a number of different functions. Firstly, it acts as a coupling agent for the poly(ethylene glycol) component to produce the soft segment. Secondly, it acts as a coupling agent for the diol component to produce urethane-rich hard segments. Thirdly, it acts as a coupling agent for the soft and hard segments to build up the molecular weight of the resulting polymer.

The isocyanate compound may comprise one or more blocked isocyanate groups.

The di-isocyanate is typically an aliphatic di-isocyanate. Aliphatic di-isocyanates which are fluid at ambient temperatures are particularly suitable.

According to one embodiment, the di-isocyanate is of the Formula OCN—$R_1$—NCO, wherein $R_1$ is a linear or branched $C_3$-$C_{18}$-alkylene, an unsubstituted or $C_1$-$C_4$-alkyl-substituted or $C_1$-$C_4$-alkoxy-substituted $C_6$-$C_{10}$-arylene, a $C_7$-$C_{18}$-aralkylene, a $C_6$-$C_{10}$-arylene-$C_1$-$C_2$-alkylene-$C_6$-$C_{10}$-arylene, a $C_3$-$C_8$-cycloalkylene, a $C_3$-$C_8$-cycloalkylene-$C_1$-$C_6$-alkylene, a $C_3$-$C_8$-cycloalkylene-$C_1$-$C_6$-alkylene-$C_3$-$C_8$-cycloalkylene or a $C_1$-$C_6$-alkylene-$C_3$-$C_8$-cycloalkylene-$C_1$-$C_6$-alkylene.

Examples of suitable di-isocyanates may also include methylene dicyclohexyl di-isocyanate, hexamethylene di-isocyanate (isophorone di-isocyanate, toluene-2,4-di-isocyanate, toluene-2,6-di-isocyanate, mixtures of toluene-2,4 and 2,6-di-isocyanates, ethylene di-isocyanate, ethylidene di-isocyanate, propylene-1,2-di-isocyanate, cyclohexylene-1,2-di-isocyanate, cyclohexylene-1,4-di-isocyanate, m-phenylene di-isocyanate, 4,4"-biphenylene di-isocyanate, 3,3"-dichloro4,4"-biphenylene di-isocyanate, 1,6-hexamethylene di-isocyanate, 1,4-tetramethylene di-isocyanate, 1,10-decamethylene di-isocyanate, cumene-2,4-di-isocyanate, 1,5-napthalene di-isocyanate, 1,4-cyclohexylene di-isocyanate, 2,5-fluorenedi-isocyanate, methylene diphenyl di-isocyanate and polymeric 4,4'-diphenylmethane di-isocyanate.

According to one embodiment the di-isocyanate is hexamethylene di-isocyanate.

The di-isocyanate may be dicyclohexylmethane-4,4'-di-isocyanate (DMDI), typically having a molecular weight of 262.5.

The di-isocyanate may be used in an amount of from about 0.05 to about 55 wt %, suitably from about 10 to about 50 wt %, generally from about 15 to about 45 wt %, typically from about 15 to 35 wt % of the reactants, alternatively from about 35 to about 45 wt % of the reactants. According to one embodiment the isocyanate may be partially or completely blocked and can be activated during polymerisation by the use of heat.

Typically, the, or each blocked isocyanate group may be activated through chemical or thermal stimuli, typically through thermal activation.

Some or all of the isocyanate groups may be activated during mixing of the reactants to form the mixture used to prepare the polymer of the invention or these may be activated post dispensing into moulds for formation of articles of manufacture (such as contact lenses) during the period of cure in an oven.

Suitable blocked isocyanate compounds are sold by Baxenden under the trade name Triexene (see for instance, Triexene B1795 and B 17960).

The amount of di-isocyanate in any given composition can be adjusted to modify the properties of articles formed from the resultant composition. According to the present invention, the reactant mixture may comprise 1:1 NCO:OH stoichiometry, however the reactant mixture may contain an excess of OH groups compared to NCO groups, or alternatively an excess of NCO groups to OH groups. Partial cross-linking can be achieved by adjusting the stoichiometry and/or by selecting the reactant that bears the appropriate number and type of reactive groups. For example, selecting a multifunctional polyol compound containing primary and secondary hydroxyls. The reactivity of primary OH groups is higher than the secondary OH groups, therefore in a random reaction which that takes place in the present invention, it can be envisaged, the more reactive OH groups would react faster leaving some unreacted secondary OH groups resulting a material which is partially cross linked.

According to one embodiment, the reactant mixture comprises an excess of OH groups compared to NCO groups and it is believed that this results in partial cross-linking and/or branching.

Alternatively, the reaction mixture may include a slight excess of NCO within a reaction mixture may also be expected to cause allophanate linkage that virtually can act as cross links.

In addition, the use of a chain extender of Formula B (generally DPG) in the reactant mixture enables the formation of contact lenses with more cross linked matrix which results in a more stable product.

As noted above, the stoichiometry (NCO:OH ratio) of the reactant mixture may play an important part in determining the properties of the resultant polymer in particular the cross-link density. Therefore the stoichiometry may be adjusted to obtain the appropriate level of cross-linking in order to afford the desired material attributes of the resultant article (EWC (Equilibrium water content), Modulus, light transmission, stability and DK). The skilled person would thus appreciate that the NCO:OH ratio can be adjusted in order to achieve the appropriate bulk properties required for a functional contact lens.

According to one embodiment, the NCO:OH ratio is 0.9:1 to 1:0.9; typically around 1:1; suitably 1.05:1.

Generally the NCO:OH ratio is around 1:1.

Alternatively, the NCO:OH ratio is 1:more than 1, so that the OH groups are in excess to the NCO groups. This may provide partial cross-linking, In other embodiments NCO:OH ratio is >1, typically 1 to 1.10:1, generally 1 to 1.05:1.

According to one embodiment, the poly(ethylene glycol) compound(s), block copolymer of ethylene oxide-propylene oxide-ethylene oxide and/or PEG-PDMS-PEG copolymer diol, the isocyanate compounds, DPG and polyfunctional compounds are employed in such proportions to provide an overall NCO/OH ratio of I to 1.10:1; generally 1 to 1.05:1. In such embodiments, the NCO groups may be in excess to the OH groups.

According to one embodiment the NCO:OH ratio is 1:0.95 to 1.05:1.

Copolymer or Block Copolymer

The reactant mixture generally comprises a block copolymer of ethylene oxide and propylene oxide, generally comprising terminal hydroxyl groups. According to one embodiment, the copolymer of poly(ethylene glycol) (PEG) and poly(propylene glycol) (PPG) comprises terminal hydroxyl groups. The copolymer generally comprises alternating PEG and PPG groups; typically comprising, consisting or consisting essentially of the structure PEG-PPG-PEG or PPG-PEG-PPG.

Alternatively the copolymer may comprise, consist or consist essentially of the structure PEG-PEG-PPG or PPG-PPG-PEG.

The terminal hydroxyl groups of the copolymer may be primary or secondary hydroxyls, or a mixture thereof. The hydroxyl groups of the copolymer generally react with isocyanate groups during the polymerisation reaction.

According to one embodiment, the terminal OH groups are secondary hydroxyls (e.g. derived from propylene oxide units). The reactivity ratio of secondary hydroxyl groups is generally lower than primary hydroxyls.

Alternatively or additionally the terminal OH groups may be primary hydroxyls (e.g. derived from ethylene oxide units).

The reaction mixture may include more than one copolymer or block copolymer.

The copolymer of block copolymer is generally a diol.

According to one embodiment, the copolymer or block copolymer is a liquid at ambient temperatures (20 to 25° C.), giving rise to a liquid reaction mixture in which all of the reaction components and additives may be dispensed into a mould at ambient temperature, thereby allowing the reaction and curing to take place.

Generally the copolymer has a number average molecular weight of less than 5000, typically less than 3000; suitably less than 1500.

Typically the reactant mixture comprises from about 10 to about 70 wt % of the copolymer, generally from about 15 to about 30 wt % copolymer.

Where the block copolymer is present in the reactant mixture, the amount of all PEG compounds and block copolymer is generally 90 wt % or less, typically 80 wt % or less.

The incorporation of the block copolymer (generally PEG-PPG-PEG or PPG-PEG-PPG) results in improved tensile properties in articles formed from the resultant material. In particular, the incorporation of the block copolymer increases the extension to break in the resultant material and this is important for product (lens) handling, especially where the resultant material must withstand stringent sterilisation conditions.

The number average molecular weight of the block copolymer is generally less than 2000, typically 1000 to 1500 (suitably around 1100). The number of urethane groups within the resultant polymer matrix will be relatively low, and the urethane groups will be relatively far apart. As urethane groups are hydrophobic in nature, this increases the hydrophilicity of the polymer matrix. In addition, the PEG portions of the block copolymer alleviate the hydrophobic part of the block copolymer provided by the PPG portions of the block copolymer, and this reduces the chance of the formation of large hydrophobic domains in the polymer chain that would be created if PPG were used as a chain extender. The block copolymer is hydrophilic and this allows better control of the water content of the resultant polymer matrix.

Generally the block copolymer has the general structure PEG-PPG-PEG. Accordingly the PEG blocks are at the terminal ends of the block copolymer, and have primary hydroxyls that react much faster than secondary hydroxyls (such as those found in the PPG portion). This provides better control on the overall chemical reaction providing a uniform matrix at the end of the reaction.

Polyfunctional Compound

The reactant mixture used to form the polymer of the present invention includes a polyfunctional compound. The polyfunctional compound has an average functionality of at least two, generally 2.5 or more, typically 2.7 or more, suitably 3 or more, more suitably 3 to 4 or more. Generally, the polyfunctional compound has an average functionality of around 3.

The number average molecular weight of the polyfunctional compound is generally 1500 or less.

The polyfunctional compound will act to provide covalent cross-linking in the resultant polymer composition. In general, the lower the molecular weight of the polyfunctional compound, the shorter the covalent cross-linking bonds between the polymer chains. The concentration of the polyfunctional compound will determine the crosslink density of the matrix which in turn has a profound effect on stability of the resultant polymer and articles of manufacture formed therefrom. The crosslink density also has a great impact on other attributes of the resultant polymer and articles formed therefrom, including modulus, water content and elongation to break.

According to one embodiment, the polyfunctional compound has a number average molecular weight of 1300 or less, typically 1000 or less; generally 700 or less.

The polyfunctional compound may have a molecular weight from 90 to 1500; generally 90 to 1000; typically 90 to 700. Generally the polyfunctional compound may have a number average molecular weight of less than 300.

One or more polyfunctional compounds may be used.

The polyfunctional compound comprises more than two functional groups capable of reacting under the reaction conditions used to polymerise the reactant mixture; typically the polyfunctional compound comprises three functional groups capable of reacting in polymerisation. The polyfunctional compound may include functional groups such as hydroxyl, isocyanate and amine. According to one embodiment, the polyfunctional compound comprises one or more of the following types of functional group: COOH, OH, SH, $NH_2$, NHR (where R represents an alkyl group, in particular a small alkyl group, suitably methyl) and NCO.

Alternatively or additionally the polyfunctional compound may comprise any other group capable of reacting with the coreactants under the conditions of the polymerization reaction.

The polyfunctional compound may have the same or different functional groups within a molecule. Similarly more than one polyfunctional compounds may be utilised within a composition to tailor the attributes of the resultant material and articles formed therefrom.

Generally the polyfunctional compound comprises three of the same functional group.

Generally the polyfunctional compound comprises three hydroxyl functional groups.

Alternatively the polyfunctional compound may comprise a mixture of different functional groups.

Conventional cross linking agents may be used as the polyfunctional compound, such as saturated trifunctional compounds, (triols, trithiols, triamines, triamides, tricarboxylic acids) and unsaturated (including double or triple bond) trifunctional compounds, (triols, trithiols, triamines, triamides, tricarboxylic acids).

Examples of suitable polyfunctional compounds include, but are not limited to, saturated triols such as hexanetriol (HT), trimethylol propane (TMP), glycerol and multifunctional isocyanates, typically tri-isocyanates.

According to one embodiment, the polyfunctional compound comprises three hydroxyl, amine or isocyanate functional groups.

According to one embodiment, the polyfunctional compound is a polyol having three hydroxyl functional groups.

Generally the polyfunctional compound has a molecular weight of 90 to 500 $gmol^{-1}$, typically 90 to 200 $gmol^{-1}$.

Generally the polyfunctional compound has a number average molecular weight of less than 300, typically less than 250, suitably less than 200.

The polyol is generally liquid (e.g. HT) or solid (e.g. TMP) at ambient temperature or temperatures slightly above (20 to 40° C.).

According to one embodiment, the polyfunctional compound is a polyol such as glycerol, trimethylpropane (TMP) or hexanetriol (HT).

The polyfunctional compound may be trimethylol propane (TMP).

Suitably the polyfunctional compound is hexanetriol (HT).

The polyfunctional compound may be a trifunctional isocyanate.

In particular, the polymer composition of the invention may be prepared using at least one poly-isocyanate i.e., having more than two functional reactive groups. Typically, the poly-isocyanate is an organic poly-isocyanate. In such embodiments, the polyfunctional compound is generally a poly-isocyanate. The reactant mixture generally also comprises a di-isocyanate compound.

The isocyanate performs a number of different functions. Firstly, it acts as a coupling agent for the diol component to produce the soft segment. Secondly, it acts as a coupling agent to produce urethane-rich hard segments. Thirdly, it acts as a coupling agent for the soft and hard segments to build up the molecular weight of the resulting polymer. It may also act as a cross linker, in this case a di-isocyanate and a poly-isocyanate may be included in the reactant mixture.

Suitable poly-isocyanates for use in the compositions of the present invention include, trifunctional trimer (isocyanurate) of isophorone di-isocyanate, trifunctional trimer (isocyanurate) of hexamethylene di-isocyanate and polymeric 4,4'-diphenylmethane di-isocyanate.

More suitably, the poly-isocyanate is aliphatic. Typically, the poly-isocyanate is liquid at ambient temperature.

The polyisocyanate may be partially or completely blocked and activated in situ by the use of heat and/or chemical stimuli. Suitable blocked isocyanate compounds are sold by Baxenden under the trade name Triexene (see for instance, Triexene B1795 and B 17960.

According to one embodiment, all of the functional groups of the polyfunctional compound may be blocked prior to formation of the reactant mixture.

According to a further embodiment, some of the functional groups of the polyfunctional compound groups are blocked prior to the formation of the reactant mixture.

The functional groups may be blocked with any suitable compound which prevents reaction of the relevant functional groups under the reaction conditions generally used to form the polymer of the invention prior to activation of the functional group. Typically activation involved exposure of the polyfunctional compound to heat and/or chemical activation agents. Generally the blocked functional groups are activated through thermal activation post dispensing into contact lens moulds at the temperature of curing (e.g., 95° C.).

Generally, the polyfunctional compound is used in an amount of from about 0.5 to 3 wt %; typically 0.7 to I wt %; alternatively 2 to 3 wt %.

Where the polyfunctional compound is a poly-isocyanate, the poly-isocyanate may be used in an amount of from about 0.04 to about 5 wt %, suitably from about 0.05 to about 3 wt %.

The amount of polyfunctional compound in any given composition can be adjusted to modify the properties/attributes of the resultant article (e.g., contact lens)/polyurethane composition.

Generally the functional groups of the polyfunctional compound (generally hydroxyl groups), react with the isocyanate groups forming urethane groups. The multifunctionality of the polyfunctional compound produces cross-linked or branched polymer matrix. In general, the overall degree of crosslink density of the resultant material determines the associated material strength of the resultant materials. Accordingly articles formed from the material are provided with structural integrity when subjected to, for example, moist heat sterilization or UV sterilization and storage.

As noted above, the stoichiometry (NCO/OH ratio) of the reactant mixture may play an important part in determining the extent of cross-linking. For example, the cross-link density, and hence the molecular weight/modulus of the material, is expected to be relatively high for a 1:1 NCO:OH stoichiometry, and such a material is also expected to afford relatively lower water content on hydration than the polymer afforded by a composition that has a non stoichiometric ratio (e.g. more OH groups than NCO groups). The skilled person would in general avoid using multifunctional reactants for producing thermoplastic material, however the current invention exploits the use of multifunctional reactants and by carefully controlling the stoichiometry, unexpectedly to skilled person, affords a thermoplastic material. Furthermore it can be appreciated that the NCO:OH stoichiometry can be adjusted so as to obtain a material with the desired modulus and to suitable water content.

Generally the reactant mixture used to form the polymer of the present invention comprises 5 wt % or less polyfunctional compound; typically 4 wt % or less; generally 3 wt % or less.

According to one embodiment, the reactant mixture used to form the polymer of the present invention comprises 2 wt % or less polyfunctional compound.

The reactant mixture used to form the polymer generally comprises 0.5 to 3 wt % polyfunctional compound.

The reactant mixture used to form the polymer of the present invention comprises 5 wt % or less of any compound having an average functionality of more than 2 (typically having a functionality of 3 or 4).

Generally the polyfunctional compound is the only species in the reactant mixture having an average functionality greater than 2.

According to one embodiment, the polyfunctional compound may represent more than one compound which may each have the same or a different average functionality.

Polyfunctional compounds (such as, for example hexane triol (HT) and TMP) comprise at least three functional groups capable of reacting under the polymerisation conditions. As such the inclusion of such monomers creates cross-links between the polymer chains within the polymer composition. In general cross-linked compositions are thermoset meaning that the composition degrades before melting. As such, cross-linked compositions do not generally flow and are therefore unsuitable for injection moulding technique. A skilled man would consider a cross-linked composition to be unsuitable for injection moulding techniques, and would avoid the inclusion of polyfunctional compounds in compositions for use in such techniques.

Generally the moulded articles of the present invention have an associated extension to break of at least 100%, typically 200 to 1000% or more or more, suitably 300-600% or more.

Typically the moulded articles of the present invention that contain a silicone component have an associated DK of at least 50 Barrer and typically have a water content of more than 20 wt %. The contact lenses made from composition without a silicone component typically afford a DK ~30 or more and a water content ~60-75 wt %.

The polyfunctional compound is used in an amount effective to produce a desired degree of cross linking in the resultant polymer/article of manufacture. The desired cross-link density generally may be different in compositions with or without silicone component.

According to one embodiment which does not contain silicone component, the polyfunctional compound is present at an amount of 0.5 to 1.5 wt % of the reactant mixture, generally 0.8 to 1.2 wt %, and suitably 1 to 1.2 wt %.

According to another embodiment wherein the polymer contains a silicone component, the polyfunctional compound is present at an amount of 0.5 to 3.5 wt % of the reactant mixture, generally 0.8 to 2.8 wt %, and suitably 1 to 2.5 wt %.

According to one embodiment, the polyfunctional compound may be an alkyl terminated silicone with at least three hydrocarbyl substituents, terminated with a group which polymerises under the reaction conditions used to polymerise the reactant mixture. Generally the hydrocarbyl group is terminated with a COOH, OH, SH, $NH_2$ or NCO or NCHR group (where R represents alkyl, suitably a small alkyl group), typically an OH or $NH_2$ group, suitably an OH group.

Generally the non-silicone content of the polyfunctional compound is 10 to 60 wt %.

Additional Chain Extender

The polymer composition of the invention is optionally prepared using at least one additional chain extender.

The chain extender may be terminated with any group capable of reacting under the polymerisation conditions used to form the polymer of the present invention. According to one embodiment, the chain extender comprises COOH, OH, SH and/or $NH_2$ terminal groups.

The, or one of the chain extender(s) used may have the structure of Formula I,

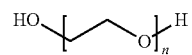

wherein n is an integer from 1 to 25, typically 2 to 25, suitably 3 to 10, more suitably 3 to 4.

Where n is 2 or more, the diol includes one or more ether groups. The presence of such ether groups increases the hydrophilicity of the resultant composition.

In one embodiment, the chain extender is diethylene glycol (DEG), i.e. n is 2.

According to one embodiment, the chain extender is triethylene glycol (TEG), i.e., n is 3.

Advantageously, compositions derived from TEG produce thermoformable polymers that show high light transmissibility in the fully water swollen state.

Suitably the chain extender is a PEG compound, typically having a molecular weight of 500 or less, suitably 100 to 300, generally around 200. Such a PEG compound is similar to tetraethylene glycol (TTEG), i.e. n is 4.

Typically the reactant mixture comprises 5 to 15 wt %, generally 5 to 10 wt % chain extender of Formula I.

Where the chain extender is DEG, it may be used in an amount of from about 5 to about 20 wt % of the reactants, generally, from about 10 to about 16 wt % of the reactants.

Where the chain extender is TEG, it may be used in an amount of from about 8 to about 45 wt % of the reactants, generally from about 5 to about 25 wt %; suitably from about 10 to about 20 wt %; typically 15 to 16 wt % of the reactants.

Where the chain extender is TTEG, it may be used in an amount of from about 1 to about 20 wt % of the reactants, generally from about 2 to about 13 wt % of the reactants.

According to one embodiment, the reactant mixture may comprise more than one chain extender compound.

Suitably the chain extender is an alkane diol or triol compound. The alkane group of the alkanediol may suitably have a carbon backbone of 2 to 10 carbon atoms, generally 2 to 5 carbon atoms.

According to one embodiment, the reactant mixture comprises a butanediol compound.

Where the reactant mixture comprises an alkanediol compound, it may be present in an amount of 1 to 10 wt % of the reactant mixture, typically 1 to 5 wt %.

The reactant mixture may comprise an amine terminated chain extender. This is particularly suitable to promote the generation of urea groups in the resultant polymer. Incorporation of an amine terminated chain extender in the reactant mixture may increase the level of hydrogen bonding in the resultant polymer. The level of covalent cross-linking in the resultant polymer may be decreased accordingly.

Suitably the amine terminated chain extender may have the structure:

Where n represents an integer of 2 to 50, generally 2 to 20, typically 2 to 12.

According to one embodiment, the amine terminated chain extender is ethylenediamine. In the above structure one $NH_2$ group may be replaced with other functional group e.g., OH group such as in monoethanolamine.

Alternatively or additionally, the amine terminated chain extender may be an amine-terminated poly (ethylene glycol) or an amine terminated poly (propylene glycol) compound. The amine terminated chain may also be cyclohexane based.

According to one embodiment, the chain extender may comprise two different terminal groups, for instance one amine group and one hydroxyl groups.

The chain extender may have the structure:

Where n represents an integer of 2 to 50, generally 2 to 20, typically 2 to 12.

Typically, the reactant mixture comprises from 2 to about 20 wt % chain extender generally from about 2 to about 15 wt % of the reactants.

The proportion of the chain extender within a given composition can also affect the material properties. Where present, the OH groups of the chain extender reacts with NCO groups (e.g. Desmodur W) to form the "hard" blocks within the resultant polymer matrix that affords the strength (tensile properties) to the material. The skilled person would thus appreciate that the proportion of the given diol can be adjusted in order to fine tune the tensile and other properties of the resulting material.

Additional Components The reaction may take place in the presence of a catalyst. Catalysts may be used to speed up the polymerization reaction and any of those catalysts normally used by those skilled in the art may be employed. For example, suitable catalysts include dibutyltin dilaurate, $FeCl_3$, stannous octoate, DABCO (1,4-diazabicyclo[2.2.2] octane), tertiary amines such as triethylamine and the like. In addition, a mixture of two or more catalysts may be suitable, for example a mixture of, DABCO and stannous octoate may be used. In one embodiment, the catalyst is dibutyl tin dilaurate (DBTDL) or a mixture of DABCO and stannous octoate. Retarded or delayed action catalyst may also be used when advantageous. Other organocatalysts may also be used for the polymerisation reaction of the present invention, examples of such catalyst include triffilic acid, methane sulphonic acid, paratoluene sulphonic acid, acetic acid, trifluoroacetic acid, biphenyl phosphate etc.

Typically the catalyst is used in an amount of from about 0.01 wt % to about 2.0 wt %, or from about 0.01 wt % to about 1.0 wt % of the reactants, suitably, from about 0.03 to about 0.8 wt %, generally from about 0.05 wt % to about 0.5 wt %, more suitably, from about 0.05 wt % to about 0.2 wt %, According to one embodiment, the catalyst is used in an amount of from about 0.05 to about 0.1 wt % of the reactants, generally about 0.05 wt % of the reactants.

The reaction mixture may be in a dehydrated state, i.e. the mixture is substantially anhydrous and substantially excludes water. Typically, the components of the reaction mixture are liquid on heating and when dispensed into moulds used for the manufacture of an article such as contact lens. The components that are solid at ambient after dissolution may become part of liquid mixture and/or liquefy at the temperature of reaction.

The reaction of the invention generally proceeds with the isocyanate reacting randomly with the PEG, the polyfunctional compound, the silicone containing macromer and the chain extender if present to eventually form a polymer matrix/material. Generally, the resulting polymer matrix allows high flux of oxygen. Where the polymer of the present invention is formed into a lens, the lens has a high associated DK.

In one embodiment, the composition further comprises one or more antioxidants. Suitable antioxidants include those generally used for polyurethanes which may be reactive or non reactive with other components of the composition. These include BHA (butylated hydroxy anisole), BHT (butylated hydroxytoluene) and ascorbic acid etc. Suitably, the antioxidant is BHA.

Generally, the antioxidant is used in an amount of about 0.01 to about 10 wt % of the reactants, suitably from about 0.1 to about 5 wt %, typically from about 0.2 to about 1 wt % of the reactants in any given composition.

According to one embodiment of the present invention, the antioxidant is present at an amount of about 0.5 to about 1.0 wt % of the reactants. More than one antioxidant and/or synergistic antioxidant may also be used in the composition as suited for the product.

Typically, the modulus of articles prepared from the polymer compositions of the invention is from about 0.1 to about 8 MPa or more, generally about 0.1 to about 1.2 MPa, suitably from about 0.2 to about 0.9 MPa.

In one embodiment, the composition of the invention further comprises one or more tinting agents. By way of example, suitable tinting agents commonly used in the contact lens industry include the following: benzene sulfonic acid, 4-(4,5-dihydro-4-((2-methoxy-5-methyl-4-((2-(sulfooxy)ethyl)sulfonyl)phenyl)azo-3-methyl-5-oxo-1H-pyrazol-1-yl); [2-naphthalene-sulfonic acid, 7-(acetylamino)-4-hydroxyl-3-((4-((sulfo-oxyethyl)sulfonyl)phenyl)azo)-]; [5-((4,6-dichloro-1,3,5-triazin-2-yl)amino-4-hydroxy-3-((1-sulfo-2-naphthalenyl)azo-2,7-naphthalene-disulfonic acid, trisodium salt]; [copper, 29H, 31H-phthalocyaninato(2-)-$N_{29},N_{30},N_{31},N_{32}$)-,sulfo((4((2-sulfooxy)ethyl)sulfonyl)-phenyl)amino) sulfonyl derivative]; and [2,7-naphthalene-sulfonic acid, 4-amino-5-hydroxy-3,6-bis((4-((2-(sulfoxy) ethyl)sulfonyl) phenyl)azo)-tetrasodium salt].

Suitable tinting agents for use in the present invention are phthalocyanine pigments such as phthalocyanine blue and phthalocyanine green, chromic-alumina-cobaltous oxide, chromium oxides, and various iron oxides for red, yellow, brown and black colours, chromophtal violet and chromophtal oxide green. The use of organic pigments, particularly phthalocyanine pigments, more particularly copper phthalocyanine pigments, and even more particularly copper phthalocyanine blue pigment (e.g., Colour Index Pigment Blue 15, Constitution No. 74160) is suitable. Opaquing agents such as titanium dioxide may also be incorporated into cosmetic lenses. For certain applications, a mixture of colours may be employed for better simulation of natural iris appearance.

In one embodiment, the tinting agent is a handling tint such as Reactive Blue 4.

The weight percentage of the tinting agent may be from about 0.0001% to about 0.08%, generally 0.0001% to about 0.05%. In one embodiment, the tinting agent is present in an amount of from about 0.005 to 0.08 wt %. In one embodiment, the weight percentage of the tint is from about 0.0001% to about 0.04%, suitably, from about 0.0001% to about 0.03 wt % of the reactants.

In one embodiment, the composition of the invention further comprises one or more UV blockers or UVW absorbers. A UVW absorber may be, for example, a strong UV absorber that exhibits relatively high absorption values in the UV-A range of about 320-380 nanometers, but is relatively transparent above about 380 nm. Suitably, the UV Blocker is a commercially available UV Blocker such as AEHB (acryloxyethoxy hydroxybenzophenone; $C_{18}H_{16}O_5$).

Generally speaking, a VW absorber, if present, is provided in an amount from about 0.5 wt % to about 1.5 wt % of the reactants, suitably from about 0.6 wt % to about 1.0 wt % UV absorber, typically, about 1.0 wt % of the reactants.

The tinting agent and/or UV blockers can also be charged into the lenses at the lens hydration stage post polymerisation after formation of the lenses. Other additives like surface modifiers may also constitute the reactive mixture and/or may be charged into/onto lens during hydration.

In one embodiment, the composition of the invention comprises one or more modulus modifier and/or diluents.

The surface modifier may typically be silicone-containing, PEG based or ester based. Others include copolymers composed of two poly(glycerol monomethacrylate) terminal blocks and a central (polydimethylsiloxane) block, dimethyl myristyl phosphatadyl choline,poly(2-methacryloyloxyethyl phosphorylcholine), PVP, PEG-PPG-PEG copolymers etc.

In one embodiment the compound may be as poly(ethylene glycol) monoalkyl or dialkyl ether compound. According to one embodiment, the reactant mixture may comprise one or more additional components such as a modulus modifier, plasticiser, humectant, lubricant, process aid, viscosity reducer, compatibility enhancer diluents and/or polymer matrix structure modifier.

Generally, the additional component is present in an amount of 0 to about 20 wt % of the reactant mixture, typically from about 2.5 to about 10 wt %, suitably from about 4 to about 6 wt % of the reactant mixture.

According to one embodiment the reactant mixture comprises a poly(ethylene glycol) dialkyl ether compound. Typically the alkyl group of the poly(ethylene glycol) dialkyl or ether is a small alkyl group comprising no more than 1 to 6 carbon atoms, suitably 1 to 4 carbon atoms. According to one embodiment, the poly(ethylene glycol) dialkyl ether is poly(ethylene glycol) dimethyl ether (PEG DME) or poly (ethylene glycol) dibutyl ether (PEG DBE).

According to one embodiment, the additional component is poly(ethylene glycol) dimethyl ether (PEG DME), which can act as a modulus modifier, plasticizer, humectant/lubricant, process aid, viscosity reducer, compatibility enhancer and polymer matrix structure modifier. PEG DMEs of various molecular weights (e.g. 250, 500, 1000, 2000) are commercially available and are suitable for use in the present invention. Preferably, for the purposes of the present invention, the PEG DME has a molecular weight of 1000 or less (e.g. PEG DME-250 or PEG DME-1000). As an alternative, polyethylene glycol dibutyl ether can also be used. Alternatively or additionally one or more poly(ethylene glycol) monoalkyl ether compound may be used such as poly(ethylene glycol) monomethyl ether.

Suitably, where included in the reactant mixture, the polyethyleneglycol dialkyl ether or monoalkyl ether compound is present in an amount of about 0.5 to about 20 wt %, generally from about 2.5 to about 10 wt %, typically about 4 to about 6 wt % of the reactants.

According to one embodiment, the mixture comprises one or more plasticiser compounds comprising a silicone portion and a PEG portion. In particular, the plasticiser may be a silicone/PEG copolymer. Suitable compounds include those having the general structure:

where each R group independently represents a hydrocarbyl group, in particular an alkyl group, especially a small alkyl group such as methyl;
K represents an integer from 1 to 20, typically 1 to 10;
X represents an integer from 1 to 100, generally 1 to 20;
M represents an integer from 1 to 100, generally 1 to 20;
N represents an integer from 1 to 20, typically 1 to 10.

In particular the silicone/PEG copolymer may have the structure of formula J:

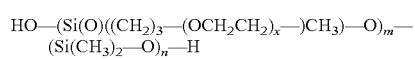

According to one embodiment, the silicone/PEG copolymer is of the structure of formula J comprising 60 to 70 wt % non-siloxane portion, and having a number average molecular weight of around 600.

Suitably, where included in the reactant mixture, the polyethyleneglycol dialkyl ether or monoalkyl ether compound is present in an amount of about 0.5 to about 20 wt %, generally from about 2.5 to about 10 wt %, typically about 4 to about 6 wt % of the reactants.

In another embodiment the plasticiser may be an ester i.e. citrate based, (Tri ethyl citrate, tributyl citrate, acetyl tributyl citrate), Dibutyl sebacate, Teg MeR 809, Most of these are commercially available as off the shelf products.

Suitable compounds for use as the additional component are known in the art.

According to one embodiment, the additional compound may be monofunctional that can react with the co-reactants and act as an internal plasticiser which enables the fine tuning of the attributes of a contact lens (e.g. PEGMe).

Specific Compositions

According to one embodiment there is provided a polyurethane xerogel prepared from a mixture comprising:
(a) at least one PEG compound;
(b) at least one block copolymer of ethylene oxide and propylene oxide;
(c) at least one di-isocyanate
(d) 0.5 to 4 wt % of a polyol, generally TMP;
(e) 1 to 20 wt % DPG;
wherein the reactants are reacted under substantially anhydrous conditions wherein the mixture has an associated NCO:OH ratio of 1 or more A reactant mixture used to form an exemplary composition of the present invention comprises:
1. 25 to 50 wt % of a first PEG compound having a number average molecular weight of 5000 to 6000;
2. 5 to 15 wt % of a second PEG compound having a number average molecular weight of 3000 to 4000;

3. 15 to 30 wt % of at least one di-isocyanate, suitably Desmodur W (methylene bis (4,4'cyclohexyl isocyanate), molecular weight, MW=around 262.5);
4. 0.6 to 1 wt % TMP;
5. 4 to 5 wt % DPG;
6. 0.05 to 0.1 wt % catalyst, generally DBTDL.
7. 0 to 0.5 wt % antioxidant, such as BHA
8. 0 to 0.001 tinting agent such as reactive blue 4.

Generally where the components listed above form 100 wt % of the reactant mixture.

Alternatively, the components listed above may form up to 90 wt % of the reactant mixture, with the remaining reactant mixture being formed from additional components as described herein.

Generally the NCO:OH ratio of the mixture is 1 or more.

According to a further aspect of the present invention there is provided a polyurethane xerogel prepared from a mixture comprising:
(f) at least one PEG compound;
(g) at least one PEG-PDMS-PEG copolymer diol;
(h) at least one di-isocyanate
(i) 0.5 to 4 wt % of a polyol, generally TMP;
(j) 1 to 20 wt % DPG;
wherein the reactants are reacted under substantially anhydrous conditions.

According to one embodiment there is provided a polyurethane xerogel prepared from a mixture comprising:
(k) at least one silicone compound, generally comprising a PDMS portion and a PEG portion, in particular of Formula A, generally having an average functionality of 2 or less;
(l) at least one chain extender of Formula B, typically of Formula Bi;
(m) at least one additional chain extender, typically of Formula I;
(n) a polyfunctional compound, typically having a number average molecular weight of 1500 or less, generally a triol such as TMP or HT;
(o) at least one diisocyanate, suitably dicyclohexylmethane-4,4'-diisocyanate (DMDI);
(p) a PEG compound, generally having a molecular weight of 10,000 or less;
wherein the mixture comprises 5 wt % or less of the sum of all compounds having an average functionality of more than 2;
wherein the reactants are reacted under substantially anhydrous conditions.

Generally the NCO:OH ratio of the mixture is 1: less than 1.

Alternatively, the NCO:OH ratio of the mixture is 1:0.95 to 1.05.

A reactant mixture used to form an exemplary composition of the present invention comprises:
i. 3 to 10 wt % of a first PEG compound having a number average molecular weight of 1500 to 2500;
ii. 0 to 1 wt % of a second PEG compound having a number average molecular weight of 3000 to 4000;
iii. 5 to 15 wt % of a first PEG-PDMS-PEG copolymer diol having a number average molecular weight of 1000 to 2000;
iv. 5 to 20 wt % of a second PEG-PDMS-PEG copolymer diol having a number average molecular weight of 1000 to 2000;
v. 1 to 5 wt % of a third PEG-PDMS-PEG copolymer diol having a number average molecular weight of 2000 to 3000;
vi. 30 to 60 wt % of at least one di-isocyanate, suitably dicyclohexylmethane-4,4'-di-isocyanate (DMDI);
vii. 1 to 4 wt % TMP;
viii. 1 to 2 wt % DPG;
ix. 0.05 to 0.1 wt % catalyst, generally DBTDL.
x. 0 to 1 wt % antioxidant, such as BHA.

Generally the NCO:OH ratio of the mixture is 1 or more:1; typically 1 to 1.05:1

A reactant mixture used to form an exemplary composition of the present invention comprises:
i. 5 to 7.5 wt % of at least one chain extender of Formula B, suitably of Formula Bi;
ii. 25 to 50 wt % of at least one di-isocyanate, suitably dicyclohexylmethane-4,4'-diisocyanate (DMDI);
iii. 40 to 60 wt % of at least one silicone compound, generally comprising a PDMS portion and a PEG portion, in particular of Formula A;
iv. 5 to 7.5 wt % of at least one chain extender, typically of Formula I;
v. 0.5 to 1.5 wt % of a polyfunctional compound, generally a triol such as TMP or HT;
vi. 0 to 0.5 wt % catalyst, Wherein the mixture generally comprises 5 wt % or less of the sum of all compounds having an average functionality of greater than two.

Typically the NCO:OH ratio of the mixture is 1: more than 1.

Alternatively, the NCO:OH ratio of the mixture is 1:0.95 to 1.05.

Generally where the components listed above form 100 wt % of the reactant mixture.

Alternatively, the components listed above may form up to 90 wt % of the reactant mixture, with the remaining reactant mixture being formed from additional components as described herein.

A reactant mixture used to form an exemplary composition of the present invention comprises:
i) 5 to 7.5 wt % of at least one chain extender of Formula Bi;
ii) 45 to 55 wt % of at least one silicone compound of Formula A;
iii) 25 to 35 wt % of a di-isocyanate such as DMDI;
iv) 5 to 7.5 wt % of at least one chain extender of Formula I;
v) 0.1 to 2 wt % of a polyfunctional compound, generally a triol such as TMP or HT;
vi) 0 to 1 wt % antioxidant;
vii) 0 to 0.5 wt % catalyst,
viii) flow modifying agent (0.1-10%)

wherein the mixture comprises 5 wt % or less of the sum of all compounds having an average functionality of greater than two.

Typically the NCO:OH ratio of the mixture is 1: more than 1.

Alternatively, the NCO:OH ratio of the mixture is 1:0.95 to 1.05.

Generally where the components listed above form 100 wt % of the reactant mixture.

Alternatively, the components listed above may form up to 90 wt % of the reactant mixture, with the remaining reactant mixture being formed from additional components as described herein.

Process

A further aspect of the invention relates to a process for preparing a polyurethane hydrogel, said process comprising:
(i) preparing a mixture as described above;
(ii) curing the mixture formed in step (i) directly to form a polyurethane xerogel;
(iii) hydrating the xerogel using an aqueous medium to form a hydrogel.

Preferably, the process of the present invention involves curing the reactant mixture of step i. directly to form a polyurethane xerogel without the need for the addition of water as a reactant. This is in contrast to the prior art process described in U.S. Pat. No. 6,930,196.

According to one embodiment, the reactant mixture is substantially anhydrous, i.e. without the addition of water as a reactant. The incorporation of urea groups (formed from the presence of water in the reactant mixture) additionally increases the modulus value of the resultant polyurethane composition, which is undesirable in materials for use in the contact lens industry.

Advantageously, the present invention substantially excludes water from the reactant mixture (as far as practically attainable), thereby minimising the formation of urea groups in the polymer backbone and giving rise to materials where contribution towards raising the modulus by urea groups is substantially minimised.

A further aspect of the invention relates to a process for preparing a polyurethane xerogel in the form of a moulded article, said process comprising the steps of:
(i) preparing the reactant mixture as described herein; and
(ii) reacting the mixture formed in step (i) using substantially anhydrous materials to form a polyurethane xerogel;
(iii) reaction cast moulding the polyurethane xerogel to form a moulded article.

Advantageously, the process of the invention involves reacting the reactants under substantially anhydrous conditions to form a polyurethane xerogel, without the addition of water as a reactant.

Typically, post dehydration any residual moisture in the mixture reacts along with other reactants. Suitably, the quantity of residual moisture is as low as is practically attainable and the impact on the product after reaction is negligible. Generally, the amount of water in the reaction mixture post dehydration is less than about 0.3 wt %. According to one embodiment the amount of water in the reaction mixture is less than about 0.1 wt %, typically less than about 0.05 wt %.

In one preferred embodiment of the invention the reactants in step (i) are mixed and dehydrated under vacuum. Preferably, the reactants are dehydrated under vacuum at a temperature of about 95° C. for at least 90 minutes. Generally, the reactants are dehydrated (typically under vacuum) until the moisture content of the mixture is reduced to a level below 0.05 wt %.

In one preferred embodiment, the di- or poly-isocyanate is added to a mixture of the PEG, the PPG and optionally the polyol.

Preferably, the reactants in step (i) are degassed under vacuum using a rotary evaporator.

The xerogel may be hydrated using an aqueous medium with or without a surfactant.

The process may include the step of sterilising the moulded article through the application of heat and/or high energy sources such as the application of UV, ethylene oxide, gamma rays, electron beam etc.

Alternatively, the process includes the step of sterilising the moulded article by exposing it to PUV radiation at a dose of between 1000 mJ/cm$^2$ to 2500 mJ/cm$^2$ over a period of 5-15 minutes, taking appropriate precautions such that the temperature of the thermoplastic polymer doesn't exceed 50° C.

In one embodiment, a catalyst is added to the reaction mixture. Suitable catalysts (together with guidance as to the appropriate amount) are as described above. In one embodiment, the catalyst is dibutyl tin dilaurate (DBTDL).

Additional components, such as modulus modifiers, plasticizers, humectants, lubricants, process aids, viscosity reducers, tinting agents, compatibility enhancers and/or polymer matrix structure modifiers as described above, may also be present in the reaction mixture.

As mentioned above, the polymerisation reaction is carried out under substantially anhydrous conditions. Suitably, the reactants are dehydrated under vacuum to reduce the water content as far as practically possible. Typically, the reactants (e.g. the chain extender component and the PEG component) are dehydrated under vacuum at elevated temperature using a rotary evaporator. Generally, the reactants are dehydrated under vacuum at a temperature of at least 80° C., suitably at least 95° C. Suitably, the reactants are dehydrated under vacuum at elevated temperature for at least 1 hour, generally, for at least 2 hours, typically for at least 4 hours or more. After this dehydration step, the moisture content of the reactants as measured by Karl Fisher is generally <0.050%, typically <0.035%. The conditions and timing of the dehydration process will depend upon the equipment used and the weight of material being dehydrated; generally more material will take longer to dehydrate. Optionally other methods e.g., freeze drying, molecular sieves etc may also be employed to dehydrate.

In one embodiment, the dehydrated di-hydroxy and polyfunctional reactants (and optionally the antioxidant and/or plasticiser) are added into a beaker and stirred. The beaker is placed in the oven with circulating Oxygen free dry nitrogen. Suitably, the required quantity of catalyst (e.g. dibutyl tin dilaurate) is then added to the mixture and the moisture content determined using Karl Fischer titration. Typically, the temperature is allowed to reach to about 73° C.-2° C. The beaker is then transferred into a fume hood the contents stirred thoroughly to give a homogenised mixture. The required quantity of the di-isocyanate (e.g. Desmodur W)) is then added to the mixture and stirred until clear. The mixture is then typically dispensed into pre heated polypropylene tubs that are sealed with lids and reacted to completion in an oven at 95° C. placed in a fume cupboard. In one embodiment, the reaction takes place at a temperature of from about 70° C. to about 120° C., suitably, from about 80° C. to about 110° C. Typically, the reaction takes place at a temperature of from about 90° C. to about 100° C.

Generally, the mixture is reacted for about 0.5 to about 24 hours or more, suitably, for about 3 to about 12 hours. Typically, the mixture is reacted for at least about 5 hours to about 18 hours, suitably for about 8 hours. The disappearance of the NCO absorption band at 2260 cm$^{-1}$ in the FTIR spectrum of the resulting product signifies that the reaction is complete.

The product is allowed to cool to ambient temperature and demoulded, if required after chilling to a reduced temperature.

Suitably, the product is removed from the oven and allowed to cool to ambient temperature.

In one embodiment, the product is cooled to a temperature of from about −30° C. to about −120° C. prior to removing the product from the mould.

Optionally, the product is chilled in a freezer to demould.

The demoulded product is subsequently granulated. In one embodiment, the polyurethane xerogel formed in step (ii) is granulated by grinding or the formation of pellets (typically by extruding and chopping to forms pellets suitable for injection moulding), and optionally dried under vacuum, prior to injection moulding. The injection moulding suitably takes place using conventional injection moulding apparatus (such as a BOY 50M), that will be familiar to one of ordinary skill in the art.

A further aspect of the invention relates to a process for preparing a thermoplastic polyurethane hydrogel comprising cross-linking in the form of a moulded article, said process comprising preparing a. polyurethane xerogel in the form of a moulded article as described above, and hydrating said moulded article with an aqueous medium to form a polyurethane hydrogel.

A further aspect relates to a polymer obtainable by the process of the invention.

Yet another aspect relates to the use of a polymer according to the invention in the preparation of a contact lens.

According to one embodiment, the moulded article is a medical device, in particular an ophthalmic device, such as a contact lens.

According to a further aspect of the present invention there is provided an article of manufacture obtainable by the above described method.

The moulded article may be in the form of a medical device for use in or on the body. The medical device may be exemplified by, but by no means limited to, urinary tract devices (including uretheral stents and urinary catheters), ocular devices (including contact lenses and intra-ocular lens shooter devices), intraocular lenses, orthopaedic devices, respiratory devices (including endotracheal tubes), cardiovascular devices, dental devices, neurological devices, gastrointestinal devices, audiology devices, surgical devices, including surgical gloves, foot care devices, wound healing devices, condoms and the like apheresis equipment, blood bags; blood administration tubing; extracorporeal membrane oxygenation equipment; dialysis and peritoneal drainage bags; urinary collection bags; urological catheters; wound drainage bags and tubes; enteral feeding equipment; nasogastric tubes; intravenous catheters, drip chambers, tubing and solution bags; total parenteral nutrition bags; hemodialysis tubing and catheters; film wrap; gloves; endotracheal tubes; tracheostomy tubes; oesophageal tubes; humidifiers; ocular prosthesis; or sterile water bags and tubing.

According to one embodiment the medical devices is an ophthalmic device, such as a contact lens, a catheter, or an intra-ocular lens shooter device.

It has long been acknowledged that contact lenses having a high associated oxygen permeability or DK limit corneal hypoxia which is important to the health of the eye. Increasing the DK of PEG based polymer above 50 is desirable. However PEG based polyurethane materials are limited in that the oxygen diffuses through the water phase of the material. Increasing the DK is often achieved by increasing the water content. This in turn leads to materials having a very low associated modulus. To overcome this issue, silicone compounds have been incorporated into polymers—these are able to increase the DK without increasing the water content, as the oxygen is known to be transported through the silicone phase of the material. However, it is known that incorporating hydrophobic silicone units into the hydrophilic PEG based polyurethane polymer results in a material with poor transparency or rendering the materials unsuitable for use in the manufacture of contact lenses. Surprisingly, through appropriate selection of reagents, it has now been found that the xerogel of the present invention can be generated with high DK, and good associated transparency.

Surprisingly, the polyurethane material of the present invention has an associated DK of over Barrer, typically over 50 Barrer or more, suitably more than 60 or more Barrer whilst maintaining good transparency.

A contact lens must be able to transmit light in the visible region in order to function effectively in correcting visual defects. Generally, contact lenses prepared using the polymer composition of the invention exhibit a light transmission of at least 80%, typically at least 90%, typically at least 95% or 97%. According to one embodiment, the light transmissibility is from about 90 to about 100%, suitably from about 95 to about 100%, more suitably about 100%.

Typically, contact lenses prepared using the polymer composition of the invention exhibit a modulus of from about 0.1 to about 1.50 MPa, suitably from about 0.25 to about 0.9 MPa.

Moreover, the absence of water (as far as practically attainable) minimises the formation of urea groups in the polymer backbone which may in some circumstances be desirable, in particular where it is desired to reduce the modulus of the material.

The modulus of a contact lens plays a key role in controlling the mechanical properties of a soft contact lens. In addition, the on-eye performance is directly affected by the modulus. A value of greater than 1.25 MPa is likely to cause corneal staining whilst a modulus below 0.2 MPa is likely to lead to a lens with poor handling properties.

Surprisingly the modulus of items of manufacture formed from the materials of the present invention is generally from 0.25 to 0.85 MPa despite the polymer of the present invention having relatively high silicone content.

According to one embodiment, contact lenses prepared using the polymer composition of the invention have a water content of 10 to about 90 weight %, typically, from about 20 to about 80 weight %, suitably, from about 25 to about 75 weight %, generally, from about 30 to about 70 weight %, more suitably, from about 35 to about 70 weight %.

The equilibrium water content of the lens is a function of the material properties and plays a key role in determining the bulk, mechanical and physical properties of the lens. Water provides the medium to transmit oxygen and with the modulus governs the on eye properties/performance of the lens. It also plays an important role in the movement of lens when on eye and advantageously the lenses of the current invention provides the optimum level required i.e., −30 wt % or more in compositions. The water content of compositions, of the present invention, with the siloxane content is generally lower than the compositions without the siloxane content.

Process for Preparing a Contact Lens

A further aspect of the present invention relates to a process for preparing a contact lens comprising the steps of:
1. preparing a reactant mixture as described above;
2. dispensing the reaction mixture formed in step i) into a contact lens mould;
3. allowing the reaction mixture to react and cure (generally with the assistance with energy, in particular thermal energy or other means of radiation);

4. removing the contact lens from the mould; and hydrating the contact lens, in an aqueous fluid, optionally comprising a non-ionic surface active agent, such as a polysorbate or poloxamer compound or mixture thereof The process may include the step of sterilising the moulded article through the application of heat and/or high energy sources such as the application of UV, ethylene oxide, gamma rays, electron beam etc.

Generally the reaction mixture must be dispensed in molten form at temperatures of from 50 to 70° C. as the reaction mixture is generally not liquid at ambient temperature.

In one preferred embodiment, the reactants in step (i) are dispensed into a female lens mould and the male part of the lens mould is then placed over the liquid contained in the female part and subsequently closed, typically by a machine or other means.

In one preferred embodiment, the moulds are placed in an oven and allowed to cure to complete the reaction. Preferably, the moulds are allowed to cure at a temperature of from about 70° C. to about 100° C., more preferably, from about 85° C. to about 95° C. In one highly preferred embodiment, the moulds are allowed to cure at a temperature of least 95° C.

Preferably, the moulds are allowed to cure for about 0.5 to about 24 hours, more preferably for about 15 to 22 hours. Alternatively, the moulds may be allowed to cure for about 3 to about 8 hours, typically for at least about 5 hours. Optionally the curing can also be done in the oven under a dry nitrogen flow.

Preferably, the moulds are removed from the oven and allowed to cool to around ambient temperature, and then may be demoulded after cooling if necessary.

Optionally, after step (iii) the mould may be cooled to a temperature of from about −30° C. to about −120° C. prior to removing the contact lens from the mould.

Suitably, the moulds are chilled in a freezer. More preferably, still, the moulds are chilled to a temperature of from about −50° C. to about −90° C., even more preferably from about −60° C. to about −90° C. More preferably still, the moulds are chilled to a temperature of about −80° C. Preferably, the moulds are chilled for about 30 minutes, more preferably, at about 60 minutes. In one especially preferred embodiment, the lenses are chilled for at least 20 minutes.

Advantageously, the cooling process allows the polymer chains to attain a temperature below the glass transition temperature that shrinks the polymer matrix and reduces the interaction at the interface which enhances the demoulding of the lens product.

The lenses are then preferably demoulded from the moulds by separating the male and female parts. Preferably, the lenses are hydrated by immersion in a hydration solution. Typically the hydration solution comprises saline solution which may optionally comprise surfactant. According to one embodiment the hydration solution comprises a non-ionic surface active agent, such as a polysorbate or poloxamer compound e.g., P123. In particular, the hydration solution comprises polysorbate 20.

Alternatively, in another preferred embodiment where a modulus modifier has been used in the formulation, the lens moulds are physically separated (at ambient temperature) and the part containing the lens immersed in excess of saline solution (optionally comprising surfactant) for 5-150 minutes, more preferably for 60-90 minutes, more preferably still for 30-60 minutes, to demould the lens.

Generally, processing step (ii) involves reaction cast moulding where the material is moulded into the shape of a lens. This process is generally referred to as reaction cast moulding (RCM), and the lens produced by this method is termed here as an RCM lens.

The polymeric composition of the present invention is covalently cross-linked and, once polymerised, will not melt or flow without chemical decomposition.

Advantageously, the polymeric composition of the present invention, or an article of manufacture formed therefrom, is able to withstand autoclave steam sterilisation without significant permanent distortion of its dimensions when returned to ambient temperature.

Steam sterilisation generally takes place under increased temperature and pressure. Typically temperatures of 100 to 130° C. are used. Pressures of up to 130 kPa are commonly used.

According to a further aspect of the present invention there is provided an injection moulded article of manufacture obtainable by the above described method, or a strip to be used in an ocular environment.

The present invention will now be described by way of non-limiting example only.

EXAMPLES

Examples of Embodiments without Silicone Component

Example 1

| Material | Mn | Mass/g | No. of Mols | Mol % | wt % |
|---|---|---|---|---|---|
| PEG 6000 | 5761 | 12 | 0.0021 | 4.5% | 39.2695 |
| DPG | 134.17 | 1.5 | 0.0112 | 23.9% | 4.9087 |
| PEG-PPG-PEG | 1100 | 7 | 0.0064 | 13.6% | 22.9072 |
| PEG 3350 | 3447 | 3.5 | 0.0010 | 2.2% | 11.4536 |
| BHA | 180.24 | 0.031 | 0.0002 | 0.4% | 0.1014 |
| TMP | 134.17 | 0.276 | 0.0021 | 4.4% | 0.9032 |
| DMDI | 262.5 | 6.251 | 0.0238 | 51.0% | 20.4563 |
| DBTDL | 0.10% | 0.0306 | | | |
| Total | | 30.558 | | | |

NCO:OH = 1:1
Average Results From six Batches
Dk = 37 barrers; CA = 57°; % EWC = 69; Transmittance at 550 nm = 97%; Modulus = 0.87 MPa; Extension to break = 565%.

Where CA represents sessile drop contact angle; EWC is equilibrium water content; DMDI=Desmodur W; DBTDL=Dibutyl tin dilaurate the other symbols represent as described in the text.

Example 2 (Less TMP)

| Material | Mn | Mass/g | No. of Mols | Mol % | wt % |
|---|---|---|---|---|---|
| PEG 6000 | 5761 | 12 | 0.0021 | 4.5% | 39.4271 |
| DPG | 134.17 | 1.5 | 0.0112 | 24.2% | 4.9284 |
| PEG-PPG-PEG | 1100 | 7 | 0.0064 | 13.8% | 22.9992 |
| PEG 3350 | 3350 | 3.5 | 0.0010 | 2.3% | 11.4996 |
| BHA | 180.24 | 0.031 | 0.0002 | 0.4% | 0.1019 |
| TMP | 134.17 | 0.243 | 0.0018 | 3.9% | 0.7984 |
| DMDI | 262.5 | 6.162 | 0.0235 | 50.9% | 20.2455 |
| DBTDL | 0.10% | 0.0304 | | | |
| Total | | 30.436 | | | |

Results From 3 Batches
CA = 57°; % EWC = 70; Modulus = 0.63 MPa; Extension to break = 916%

Example 3 (More PEG 6000)

| Material | Mn | Mass/g | No. of Mols | Mol % | wt % |
|---|---|---|---|---|---|
| PEG 6000 | 5761 | 18 | 0.0031 | 6.6% | 42.0221 |
| DPG | 134.17 | 1 | 0.0075 | 15.7% | 2.3346 |
| PEG-PPG-PEG | 1100 | 7 | 0.0064 | 13.4% | 16.3419 |
| PEG 3350 | 3447 | 10 | 0.0029 | 6.1% | 23.3456 |
| BHA | 180.24 | 0.062 | 0.0003 | 0.7% | 0.1447 |
| TMP | 134.17 | 0.386 | 0.0029 | 6.1% | 0.9011 |
| DMDI | 262.5 | 6.387 | 0.0243 | 51.3% | 14.9099 |
| DBTDL | 0.10% | 0.0428 | | | |
| Total | | 42.835 | | | |

Average Results From 3 Batches
CA = 57°; % EWC = 75; Modulus = 0.56 MPa; Extension to break = 245%

Example 4 (More PEG 6000)

| Material | Mn | Mass/g | No. of Mols | Mol % | wt % |
|---|---|---|---|---|---|
| PEG 6000 | 5761 | 14 | 0.0024 | 5.4% | 36.3647 |
| DPG | 134.17 | 1 | 0.0075 | 16.5% | 2.5975 |
| PEG-PPG-PEG | 1100 | 7 | 0.0064 | 14.1% | 18.1824 |
| PEG 3350 | 3447 | 10 | 0.0029 | 6.4% | 25.9748 |
| BHA | 180.24 | 0.062 | 0.0003 | 0.8% | 0.1610 |
| TMP | 134.17 | 0.347 | 0.0026 | 5.7% | 0.9013 |
| DMDI | 262.5 | 6.090 | 0.0232 | 51.2% | 15.8183 |
| DBTDL | 0.10% | 0.0385 | | | |
| Total | | 38.499 | | | |

Average Results From 3 Batches
CA = 64°; % EWC = 76; Modulus = 0.48 MPa; Extension to break = 365%

Example 5 (NCO:OH=1.05:1.0)

| Material | Mn | Mass/g | No. of Mols | Mol % | wt % |
|---|---|---|---|---|---|
| PEG 6000 | 5761 | 12 | 0.0021 | 4.4% | 38.9101 |
| DPG | 134.17 | 1.5 | 0.0112 | 23.4% | 4.8638 |
| PEG-PPG-PEG | 1100 | 7 | 0.0064 | 13.3% | 22.6976 |
| PEG 3350 | 3350 | 3.5 | 0.0010 | 2.2% | 11.3488 |
| TMP | 134.17 | 0.28 | 0.0021 | 4.4% | 0.9079 |
| DMDI | 262.5 | 6.560 | 0.0250 | 52.3% | 21.2719 |
| BHA | 0.10% | 0.0308 | 0.0477 | | |
| DBTDL | 0.10% | 0.0308 | | | |
| Total | | 30.840 | | | |

Average Results
Dk = 34.20 barrers; % EWC = 67; Modulus = 0.72 MPa; Extension to break = 337%

Example 6 (More TMP)

| Material | Mn | Mass/g | No. of Mols | Mol % | wt % |
|---|---|---|---|---|---|
| PEG 6000 | 5761 | 20 | 0.0035 | 6.1% | 49.7283 |
| DPG | 134.17 | 2 | 0.0149 | 26.2% | 4.9728 |
| PEG-PPG-PEG | 1100 | 4 | 0.0036 | 6.4% | 9.9457 |
| PEG 3350 | 3350 | 6 | 0.0018 | 3.1% | 14.9185 |
| BHA | 180.24 | 0.04 | 0.0002 | 0.4% | 0.0995 |
| TMP | 134.17 | 0.483 | 0.0036 | 6.3% | 1.2009 |
| DMDI | 262.5 | 7.696 | 0.0293 | 51.5% | 19.1343 |
| DBTDL | 0.10% | 0.0402 | | | |
| Total | | 40.219 | | | |

Results
CA = 43°; % EWC = 71; Modulus = 1.08 MPa; Extension to break = 235%

Example 7 (No BHA)

| Material | Mn | Mass/g | No. of Mols | Mol % | wt % |
|---|---|---|---|---|---|
| PEG 6000 | 5761 | 9 | 0.0016 | 2.2% | 25.3630 |
| DPG | 134.17 | 2.5 | 0.0186 | 26.2% | 7.0453 |
| PEG-PPG-PEG | 1100 | 10.25 | 0.0093 | 13.1% | 28.8856 |
| PEG 3350 | 3350 | 3.5 | 0.0010 | 1.5% | 9.8634 |
| TMP | 134.17 | 0.444 | 0.0033 | 4.7% | 1.2512 |
| DMDI | 262.5 | 9.791 | 0.0373 | 52.4% | 27.5915 |
| DBTDL | 0.10% | 0.0355 | | | |
| Total | | 35.485 | | | |

Results
CA = 46°; % EWC = 67; Modulus = 0.34 MPa; Extension to break = 216%

Examples of Embodiments that Contain Silicone Macromers

Example 8 (PEG SiHy RCM); NCO:OH=1.02:1.0

| Material | Mn | % Si | Mass/g | No. of Mols | Mol % | wt % | % Si |
|---|---|---|---|---|---|---|---|
| Silsurf 1010 | 1692.56 | 47 | 7.5 | 0.0044 | 7.1% | 17.9813 | |
| Silsurf 1508 | 1756.14 | 54 | 11 | 0.0063 | 10.0% | 26.3726 | |
| Silsurf 2510 | 2462.15 | 60 | 4 | 0.0016 | 2.6% | 9.5900 | |
| DPG | 134.173 | | 0.7 | 0.0052 | 8.3% | 1.6783 | |
| PEG 2050 | 2050 | | 7 | 0.0034 | 5.4% | 16.7826 | |
| PEG 3350 | 3350 | | 1.2 | 0.0004 | 0.6% | 2.8770 | |
| TMP | 134.17 | | 1.05 | 0.0078 | 12.5% | 2.5174 | |
| DMDI | 262.5 | | 8.849 | 0.0337 | 53.6% | 21.2148 | |
| BHA | 1.00% | | 0.4113 | 0.0628 | | | |
| DBTDL | 0.05% | | 0.0209 | | | | |
| Total | | | 41.710 | 0.001406 | | | 28.45 |

Average Results From two Batches
Dk = 50.62 barrers;
% EWC = 45;
Transmittance at 550 nm = 98%;
Modulus = 1.05 MPa;
Extension to break = 305%

Example 9 (PEG SiHy RCM); NCO:OH=1.03:1.0

| Material | Mn | % Si | Mass/g | No. of Mols | Mol % | wt % | % Si |
|---|---|---|---|---|---|---|---|
| Silsurf 1010 | 1692.56 | 47 | 7.5 | 0.0044 | 7.0% | 17.9440 | |
| Silsurf 1508 | 1756.14 | 54 | 11 | 0.0063 | 9.9% | 26.3178 | |
| Silsurf 2510 | 2462.15 | 60 | 4 | 0.0016 | 2.6% | 9.5701 | |
| DPG | 134.173 | | 0.7 | 0.0052 | 8.3% | 1.6748 | |
| PEG 2050 | 2050 | | 7 | 0.0034 | 5.4% | 16.7477 | |
| PEG 3350 | 3350 | | 1.2 | 0.0004 | 0.6% | 2.8710 | |
| TMP | 134.17 | | 1.05 | 0.0078 | 12.4% | 2.5122 | |
| DMDI | 262.5 | | 8.935 | 0.0340 | 53.9% | 21.3783 | |
| BHA | | 1.00% | 0.4113 | 0.0632 | | | |
| DBTDL | | 0.05% | 0.0209 | 0.1219 | | | |
| Total | | | 41.797 | 0.001406 | | | 28.39 |

Average Results from 3 Batches
Dk = 54.02 barrers;
% EWC = 44;
Modulus = 1.09 MPa;
Extension to break = 227%

Example 10 (PEG SiHy RCM) No BHA

| Material | Mn | % Si | Mass/g | No. of Mols | Mol % | wt % | % Si |
|---|---|---|---|---|---|---|---|
| Silsurf 1010 | 1692.56 | 47 | 7.5 | 0.0044 | 7.1% | 18.2370 | |
| Silsurf 1508 | 1756.14 | 54 | 11 | 0.0063 | 10.1% | 26.7476 | |
| Silsurf 2510 | 2462.15 | 60 | 4 | 0.0016 | 2.6% | 9.7264 | |
| DPG | 134.173 | | 0.7 | 0.0052 | 8.4% | 1.7021 | |
| PEG 2050 | 2050 | | 7 | 0.0034 | 5.5% | 17.0212 | |
| PEG 3350 | 3350 | | 1.2 | 0.0004 | 0.6% | 2.9179 | |
| TMP | 134.17 | | 1.05 | 0.0078 | 12.6% | 2.5532 | |
| DMDI | 262.5 | | 8.675 | 0.0330 | 53.1% | 21.0946 | |
| DBTDL | | 0.05% | 0.0206 | | | | |
| Total | | | 41.125 | | | | 28.85 |

Results
Dk = 52.70 barrers;
CA = 81°;
% EWC = 53; Modulus = 0.72 MPa;
Extension to break = 228%

Example 11 (PEG SiHy RCM) More TMP

| Material | Mn | % Si | Mass/g | No. of Mols | Mol % | wt % | % Si |
|---|---|---|---|---|---|---|---|
| Silsurf 1010 | 1692.56 | 47 | 7.5 | 0.0044 | 6.8% | 17.9451 | |
| Silsurf 1508 | 1756.14 | 54 | 11 | 0.0063 | 9.6% | 26.3195 | |
| Silsurf 2510 | 2462.15 | 60 | 4 | 0.0016 | 2.5% | 9.5707 | |
| DPG | 134.173 | | 0.7 | 0.0052 | 8.0% | 1.6749 | |
| PEG 2050 | 2050 | | 7 | 0.0034 | 5.2% | 16.7488 | |
| PEG 3350 | 3350 | | 1.2 | 0.0004 | 0.5% | 2.8712 | |
| TMP | 134.17 | | 1.22 | 0.0091 | 13.9% | 2.9191 | |
| DMDI | 262.5 | | 9.174 | 0.0349 | 53.5% | 21.9507 | |
| DBTDL | | 0.05% | 0.0209 | | | | |
| Total | | | 41.794 | | | | 28.39 |

Average Results from 2 Batches
Dk = 70.31 barrers;
CA = 73°;
% EWC = 44;
Transmittance at 550 nm = 99%;
Modulus = 1.21 MPa;
Extension to break = 247%

Example 12 (PEG SiHy RCM) with 4% PEGdme 1000 NCO:OH=1.03:1.0)

| Material | Mn | % Si | Mass/g | No. of Mols | Mol % | wt % | % Si |
|---|---|---|---|---|---|---|---|
| Silsurf 1010 | 1692.56 | 47 | 7.5 | 0.0044 | 7.0% | 17.9440 | |
| Silsurf 1508 | 1756.14 | 54 | 11 | 0.0063 | 9.9% | 26.3178 | |
| Silsurf 2510 | 2462.15 | 60 | 4 | 0.0016 | 2.6% | 9.5701 | |
| DPG | 134.173 | | 0.7 | 0.0052 | 8.3% | 1.6748 | |
| PEG 2050 | 2050 | | 7 | 0.0034 | 5.4% | 16.7477 | |
| PEG 3350 | 3350 | | 1.2 | 0.0004 | 0.6% | 2.8710 | |
| TMP | 134.17 | | 1.05 | 0.0078 | 12.4% | 2.5122 | |
| DMDI | 262.5 | | 8.935 | 0.0340 | 53.9% | 21.3783 | |
| BHA | | 1.00% | 0.4113 | 0.0632 | | | |
| PEG dme 1000 | | 4.00% | 1.6719 | | | | |
| DBTDL | | 0.05% | 0.0209 | | | | |
| Total | | | 41.797 | 0.001406 | | | 28.39 |

Average Results from 2 Batches
Dk = 45.70 barrers;
CA = 75°;
% EWC = 43%;
Transmittance at 550 nm = 98%;
Modulus = 1.23 MPa;
Extension to break = 332%

Example 13 (PEG SiHy RCM) with 6% PEGdme 1000 NCO:OH=1.03:1.0)

| Material | Mn | % Si | Mass/g | No. of Mols | Mol % | wt % | % Si |
|---|---|---|---|---|---|---|---|
| Silsurf 1010 | 1692.56 | 47 | 7.5 | 0.0044 | 7.0% | 17.9440 | |
| Silsurf 1508 | 1756.14 | 54 | 11 | 0.0063 | 9.9% | 26.3178 | |
| Silsurf 2510 | 2462.15 | 60 | 4 | 0.0016 | 2.6% | 9.5701 | |
| DPG | 134.173 | | 0.7 | 0.0052 | 8.3% | 1.6748 | |
| PEG 2050 | 2050 | | 7 | 0.0034 | 5.4% | 16.7477 | |
| PEG 3350 | 3350 | | 1.2 | 0.0004 | 0.6% | 2.8710 | |
| TMP | 134.17 | | 1.05 | 0.0078 | 12.4% | 2.5122 | |
| DMDI | 262.5 | | 8.935 | 0.0340 | 53.9% | 21.3783 | |
| BHA | | 1.00% | 0.4113 | 0.0632 | | | |
| PEG dme 1000 | | 6.00% | 2.5078 | | | | |
| DBTDL | | 0.05% | 0.0209 | | | | |
| Total | | | 41.797 | 0.001406 | | | 28.39 |

Average Results from 2 Batches
Dk = 48 barrers;
CA = 85°;
% EWC = 47;
Transmittance at 550 nm = 96%;
Modulus = 1.24 MPa;
Extension to break = 317%

Example 14 (PEG SiHy RCM) Less DPG; NCO:OH=1.03:1.0) 55

| Material | Mn | % Si | Mass/g | No. of Mols | Mol % | wt % | % Si |
|---|---|---|---|---|---|---|---|
| Silsurf 1010 | 1692.56 | 47 | 7.5 | 0.0044 | 7.2% | 18.0919 | |
| Silsurf 1508 | 1756.14 | 54 | 11 | 0.0063 | 10.2% | 26.5348 | |
| Silsurf 2510 | 2462.15 | 60 | 4 | 0.0016 | 2.6% | 9.6490 | |
| DPG | 134.173 | | 0.6 | 0.0045 | 7.3% | 1.4474 | |
| PEG 2050 | 2050 | | 7 | 0.0034 | 5.6% | 16.8858 | |
| PEG 3350 | 3350 | | 1.2 | 0.0004 | 0.6% | 2.8947 | |
| TMP | 134.17 | | 1.04 | 0.0078 | 12.6% | 2.5087 | |
| DMDI | 262.5 | | 8.704 | 0.0332 | 53.9% | 20.9955 | |

-continued

| Material | Mn | % Si | Mass/g | No. of Mols | Mol % | wt % | % Si |
|---|---|---|---|---|---|---|---|
| BHA | 1.00% | | 0.4113 | 0.0615 | | | |
| DBTDL | 0.05% | | 0.0207 | | | | |
| Total | | | 41.455 | 0.001406 | | | 28.62 |

Average Results from 2 Batches
Dk = 59.5 barrers;
CA = 70°;
% EWC = 47;
Transmittance at 550 nm = 98%;
Modulus = 1.28 MPa;
Extension to break = 185%

Example 15 (PEG SiHy RCM) Less DPG and More PEG 2050; NCO:OH-1.03:1.0)

| Material | Mn | % Si | Mass/g | No. of Mols | Mol % | wt % | % Si |
|---|---|---|---|---|---|---|---|
| Silsurf 1010 | 1692.56 | 47 | 7.5 | 0.0044 | 7.0% | 17.5613 | |
| Silsurf 1508 | 1756.14 | 54 | 11 | 0.0063 | 9.9% | 25.7566 | |
| Silsurf 2510 | 2462.15 | 60 | 4 | 0.0016 | 2.6% | 9.3660 | |
| DPG | 134.173 | | 0.6 | 0.0045 | 7.1% | 1.4049 | |
| PEG 2050 | 2050 | | 8 | 0.0039 | 6.2% | 18.7320 | |
| PEG 3350 | 3350 | | 1.2 | 0.0004 | 0.6% | 2.8098 | |
| TMP | 134.17 | | 1.07 | 0.0080 | 12.7% | 2.5054 | |
| DMDI | 262.5 | | 8.926 | 0.0340 | 53.9% | 20.9009 | |
| BHA | 1.00% | | 0.4113 | 0.0630 | | | |
| DBTDL | 0.05% | | 0.0214 | | | | |
| Total | | | 42.708 | 0.001406 | | | 27.78 |

Average Results from 2 Batches
Dk = 45.5 barrers;
CA -= 65°;
% EWC = 46%;
Transmittance at 550 nm = 96%;
Modulus = 1.4 MPa;
Extension to break = 294%

Example 16 (PEG SiHy RCM) Half the Amount of BHA:NCO:OH=1.02:1.0)

| Material | Mn | % Si | Mass/g | No. of Mols | Mol % | wt % | % Si |
|---|---|---|---|---|---|---|---|
| Silsurf 1010 | 1692.56 | 47 | 7.5 | 0.0044 | 7.1% | 18.1604 | |
| Silsurf 1508 | 1756.14 | 54 | 11 | 0.0063 | 10.0% | 26.6352 | |
| Silsurf 2510 | 2462.15 | 60 | 4 | 0.0016 | 2.6% | 9.6855 | |
| DPG | 134.173 | | 0.7 | 0.0052 | 8.3% | 1.6950 | |
| PEG 2050 | 2050 | | 7 | 0.0034 | 5.4% | 16.9497 | |
| PEG 3350 | 3350 | | 1.2 | 0.0004 | 0.6% | 2.9057 | |
| TMP | 134.17 | | 1.05 | 0.0078 | 12.5% | 2.5425 | |
| DMDI | 262.5 | | 8.849 | 0.0337 | 53.6% | 21.4261 | |
| BHA | 0.50% | | 0.2065 | 0.0628 | | | |
| DBTDL | 0.05% | | 0.0206 | | | | |
| Total | | | 41.299 | 0.001406 | | | 28.73 |

Average Results from 3 Batches
Dk = 52 barrers;
CA = 77°;
% EWC = 46%;
Modulus = 1.55 MPa;
Extension to break = 325%

Example 17

| Material | Mn | Mass | No. of Mols | Mol % | wt % |
|---|---|---|---|---|---|
| PEG 6000 | 5761 | 20 | 0.0035 | 6.7% | 52.5343 |
| PEG 600 | 600 | 10.1163 | 0.0169 | 32.5% | 26.5726 |
| PEG Me | 550 | 0.38 | 0.0007 | 1.3% | 0.9982 |
| BHA | 180.24 | 0.19 | 0.0011 | 2.0% | 0.4991 |
| TMP | 134.17 | 0.462 | 0.0034 | 6.6% | 1.2135 |
| DMDI | 262.5 | 6.922 | 0.0264 | 50.8% | 18.1823 |
| DBTDL | 0.10% | 0.0381 | | | |
| Total | | 38.070 | | | |

Average Results from 6 Batches
% EWC = 72%, Modulus = 0.67 MPa, Extension to break = 137%

Example 18

| Material | Mn | Mass | No. of Mols | Mol % | wt % |
|---|---|---|---|---|---|
| PEG 6000 | 5761 | 20 | 0.0035 | 7.0% | 53.5845 |
| PEG 600 | 600 | 10.1163 | 0.0169 | 34.0% | 27.1038 |
| BHA | 180.24 | 0.19 | 0.0011 | 2.1% | 0.5091 |
| TMP | 134.17 | 0.392 | 0.0029 | 5.9% | 1.0503 |
| DMDI | 262.5 | 6.626 | 0.0252 | 50.9% | 17.7524 |
| DBTDL | 0.10% | 0.0373 | | | |
| Total | | 37.324 | | | |

Average Results from 6 Batches
% EWC = 70%, Modulus = 0.92 MPa, Extension to break = 137%

Comparative Example 19

The reactant mixture as detailed in Table X was formed. Using a Mettler Toledo (AG 285) analytical balance the following (for each experiment) were weighed into a quick-fit 250 ml flask:

Silsurf (Silsurf 2510 being an example) is of Formula A above where each R group represents a methyl group, x is 25 and p is 10.

The flask was attached to a rotary evaporator with an oil bath temperature of 95° C. and the contents of the flask were dried/dehydrated for 2 hr. The moisture content of mixture was checked by Karl Fisher and if the water content was <0.05% then these materials were considered to be substantially anhydrous and used without further dehydration, otherwise these were further dehydrated under vacuum until the moisture content was <0.05%. The reactants were transferred to separate preheated polypropylene tubs.

The reactants were thoroughly mixed using an overhead Hiedolph mixer fitted with a helical ribbon stirrer. Part of the mixture was then dispensed into lens moulds and the moulds closed. A proportion of the material was transferred into a 5 ml polypropylene syringe. The remaining material in the polypropylene cup was covered by a screw cap lid and both the lens moulds and the polypropylene cup were placed in an oven at 95° C. and reacted for 5 hours. The resulting products form cast moulded lenses. The lenses, the syringe were demoulded by chilling in a freezer at −80° C. over 30 minutes. The lenses were placed directly into glass vials containing saline. These lenses were left for 24 hours to fully hydrate.

The compositions containing higher content of silicone tended to have an increased risk of some opacity.

Example 20

The method of comparative Example 19 above was repeated for the reactant mixture shown in Table Y.

TABLE X

| Material | Mn | % Si | Mass | Mass (*1.3) | Actual (g) | Mass (*4.3) | Actual | No. of Mols | wt % | % Si |
|---|---|---|---|---|---|---|---|---|---|---|
| Silsurf 2510 | 2409.79 | 60 | 22 | 28.6 | | 94.6 | 94.614 | 0.0091 | 76.5560 | |
| TEG | 150.17 | | 0 | 0 | | 0 | | 0.0000 | 0.0000 | |
| PEG 6000 | 6000 | | 2.5 | 3.25 | | 10.75 | 10.7569 | 0.0004 | 8.6995 | |
| TMP | 134.17 | | 0.44 | 0.572 | | 1.892 | 1.896 | 0.0033 | 1.5311 | |
| DMDI | 262.5 | | 3.797 | | | 16.328 | | 0.0145 | 13.2133 | |
| DBTDI | 0.05% | | 0.0144 | 0.019 | | 0.0618 | 0.0640 | 0.0345 | 0.0500 | |
| Total | | | 28.737 | | | | | 0.0273 | | 45.93 |

100% NCO

| Code | Master batch weight | Actual | TEG | Actual | Des W | Actual | RCM Moulds | Syringes | % Si | |
|---|---|---|---|---|---|---|---|---|---|---|
| Bsi Hy 215 | 24.9414 | 24.945 | 0 | 0 | 3.797 | 3.799 | 18 | 2 | 45.93 | Opaque |
| Bsi Hy 216 | 24.9414 | 24.943 | 3 | 3.038 | 9.041 | 9.095 | 18 | 2 | 35.69 | Opaque |
| Bsi Hy 217 | 24.9414 | 24.949 | 6 | 6 | 14.285 | 14.274 | 18 | 2 | 29.19 | Opaque |
| Bsi Hy 218 | 24.9414 | 24.948 | 10 | 10.036 | 21.277 | 21.267 | 18 | 2 | 23.48 | Clear |

TABLE Y

| Material | Mn | % Si | Mass | Mass (*1.3) | Actual | Mass (*4.3) | Actual | No. of Mols | wt % | % Si |
|---|---|---|---|---|---|---|---|---|---|---|
| Silsurf 2510 | 2409.79 | 60 | 20 | | | 90 | 90.0161 | 0.0083 | 50.9915 | |
| DPG | 134.17 | 0 | 2.5 | | | 11.25 | 11.3045 | 0.0186 | 6.3739 | |
| TEG | 150.17 | | 2.5 | | | 11.25 | 11.2687 | 0.0166 | 6.3739 | |
| PEG 6000 | 5767 | | 1.25 | | | 5.625 | 5.6251 | 0.0002 | 3.1870 | |
| TMP | 134.17 | | 0.375 | | | 1.6875 | | 0.0028 | 0.9561 | |
| DMDI | 262.5 | | 12.597 | | | 56.69 | | 0.0480 | 32.1176 | |
| DBTDL | 0.05% | | 1.0196 | | | 0.09 | 0.0780 | 0.1186 | 0.0500 | |
| Total | | | 39.222 | | | | | 0.0946 | | 30.59 |

100% NCO

| Code | Master batch weight | Actual | TMP | Actual | Des W | Actual | RCM Moulds | Syrings | % Si | Clarity |
|---|---|---|---|---|---|---|---|---|---|---|
| BSi Hy 246 | 26.269 | 26.284 | 0.385 | 0.39 | 12.627 | 12.67 | 36 | 2 | 30.56 | Clear |
| BSi Hy 247 | 26.269 | 26.276 | 0.385 | 0.386 | 12.374 | 12.395 | 36 | 2 | 30.56 | Clear |
| BSi Hy 248 | 26.269 | 26.285 | 0.375 | 0.372 | 12.597 | 12.622 | 36 | 2 | 30.59 | Clear |
| BSi Hy 249 | 26.269 | 26.268 | 0.375 | 0.373 | 12.345 | 12.353 | 36 | 2 | 30.59 | Clear |

All lenses appeared transparent following hydration, and contained over 30 wt % silicone.

Method of Manufacture for Producing Polymer Compositions Both with and without Silicone Component Compositional detail for several embodiments are provided in tables above, these are not exhaustive and details for only a few are provided merely to exemplify the present invention.

The reactants as per listed for each embodiment in each table are accurately weighed into a round bottom flask and dehydrated using a rotary evaporator under reduced pressure at 95° C. for at least 3-4 hours until the moisture content of the dehydrated mixture falls below 0.05 wt %. The moisture content is measured by Carl Fischer Titrator.

A known weight of this mixture is weighed into a clean preheated polypropylene tub and a lid was placed on the tub to prevent moisture entering the system. Isocyanate (typically Desmodur W) as required is then added through a syringe while the contents of the mixture in the tub are being stirred by an overhead stirrer. A small amount of this overall mixture is then degassed using the rotary evaporator and dispensed into contact lens moulds which are then closed and allowed to cure in an oven at 95° C. for 8-16 hours until the reaction completes. This is indicated by the disappearance of NCO peak at ~2260 cm$^{-1}$. The tub was lidded and also placed in the same oven for curing. The mixing, dispensing and curing was done in a fume hood and operators wear appropriate protective clothing, gloves and respirators that are suitable to handle the isocyanate. The dehydration of selected components may be carried out separately where required.

Testing for Contact Lens Attributes

The lens attributes, namely equilibrium water content, DK, Modulus, UV Transmission, Extension to break and Contact angle were measured by standard methods used by the industry.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

Throughout the description and claims of this specification, the words "comprise" and "contain" and variations of the words, for example "comprising" and "comprises", mean "including but not limited to", and are not intended to (and do not) exclude other moieties, additives, components, integers or steps. All documents referred to herein are incorporated by reference. The word copolymer and block copolymer is used to describe either.

Various modifications and variations of the described aspects of the invention will be apparent to those skilled in the art without departing from the scope and spirit of the Invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following claims.

The invention claimed is:

1. A polyurethane xerogel prepared from a mixture consisting essentially of:
   i) a high molecular weight poly(ethylene glycol) compound having a number average molecular weight of 6000±250, wherein 52 to 53 wt. % of the mixture is formed from the high molecular weight poly(ethylene glycol) compound;
   ii) a low molecular weight poly(ethylene glycol) compound having a number average molecular weight of about 600, wherein 26 to 27 wt. % of the mixture is formed from the low molecular weight poly(ethylene glycol) compound;
   iii) dicyclohexylmethane-4,4'-diisocyanate (DMDI), wherein 18-19 wt. % of the mixture is formed from DMDI;
   iv) trimethylol propane (TMP), wherein 1.2 to 1.3 wt. % of the mixture is formed from TMP;
   v) poly(ethylene glycol) methyl ether (PEG Me), wherein 0.9 to 1.6 wt. % of the mixture is formed from PEG Me; and
   vi) butylated hydroxy anisole (BHA), wherein 0.49 to 0.5 wt. % of the mixture is formed from BHA.

2. A process for preparing a polyurethane xerogel in the form of a moulded article, said process comprising the steps of:
   (i) preparing a mixture as recited in claim 1;
   (ii) reaction cast moulding the mixture formed in step (i) using substantially anhydrous materials to form a moulded article.

3. A process for preparing a contact lens comprising the steps of:
   1. preparing a mixture as recited in claim 1;
   2. dispensing the reaction mixture formed in step 1 into a contact lens mould;
   3. allowing the reaction mixture to react and cure; and
   4. removing the contact lens from the mould; and hydrating the contact lens, in an aqueous fluid.

* * * * *